United States Patent [19]

Kurita et al.

[11] Patent Number: 5,777,232

[45] Date of Patent: Jul. 7, 1998

[54] CONTROL SYSTEM FOR VIBRATORY APPARATUS

[75] Inventors: Yutaka Kurita, Hikone; Yasushi Muragishi; Hitoshi Yasuda, both of Ise, all of Japan

[73] Assignee: Shinko Electric Co., Ltd., Japan

[21] Appl. No.: 620,674

[22] Filed: Mar. 26, 1996

[30] Foreign Application Priority Data

| Mar. 29, 1995 | [JP] | Japan | 7-097739 |
| Mar. 29, 1995 | [JP] | Japan | 7-097740 |
| Mar. 31, 1995 | [JP] | Japan | 7-100466 |

[51] Int. Cl.$^6$ ............ G01M 7/02; B65G 25/04
[52] U.S. Cl. ............ 73/664; 73/668; 198/750.1; 198/752.1; 198/751
[58] Field of Search ............ 73/663, 664, 665, 73/666, 667, 668; 280/707, 708, 709, 688; 198/750–752.1, 756, 757, 761, 762, 769, 770; 318/128, 132

[56] References Cited

U.S. PATENT DOCUMENTS

| 3,842,661 | 10/1974 | Marshall et al. | 73/659 |
| 4,002,270 | 1/1977 | Reiner | 222/58 |
| 4,297,888 | 11/1981 | Hirai et al. | 73/664 |
| 4,331,263 | 5/1982 | Brown | 222/63 |
| 4,544,867 | 10/1985 | Jones, Jr. et al. | 318/129 |
| 4,677,353 | 6/1987 | Shieh | 318/128 |
| 4,737,695 | 4/1988 | Kim | 318/130 |
| 4,811,835 | 3/1989 | Bullivant et al. | 198/762 |
| 4,825,332 | 4/1989 | Aoki | 361/152 |
| 4,888,705 | 12/1989 | Friedland | 364/508 |
| 4,916,632 | 4/1990 | Doi et al. | 364/508 |
| 5,074,403 | 12/1991 | Myhre | 198/751 |
| 5,333,819 | 8/1994 | Stetson, Jr. | 244/164 |
| 5,341,307 | 8/1994 | Myhre et al. | 364/479 |
| 5,472,079 | 12/1995 | Yagi et al. | 198/162 |

FOREIGN PATENT DOCUMENTS

| 0 629 568 A2 | 12/1994 | European Pat. Off. | B65G 27/24 |
| A-2 611 328 | 8/1988 | France | |
| 2 222 279 | 2/1990 | United Kingdom | G05D 19/02 |
| WO 92/22861 | 12/1992 | WIPO | G05D 19/02 |

Primary Examiner—Hezron E. Williams
Assistant Examiner—Rose M. Miller
Attorney, Agent, or Firm—Rudnick & Wolfe

[57] ABSTRACT

In a vibratory apparatus including vibratory speed detector for detecting a vibratory speed of a vibratory machine, a self-excited oscillation controller for amplifying the output of the vibratory speed detector at a feed-back gain K, receiving the output of the vibratory speed detector as a positive feed-back signal, a power amplifier for power-amplifying the output of the self-excited oscillation controller and a vibratory exciter receiving the output of the power amplifier for vibrating the vibratory machine, the feed back gain K is changed in accordance with the equation; $K = K_1 \Delta r + K_3 (\Delta r)^3 + Kcr$, where $\Delta r$ represents the amplitude difference between a predetermined amplitude and the present amplitude, $K_1$, $K_3$ constants, and Kcr critical stability gain.

13 Claims, 25 Drawing Sheets

F I G. 10
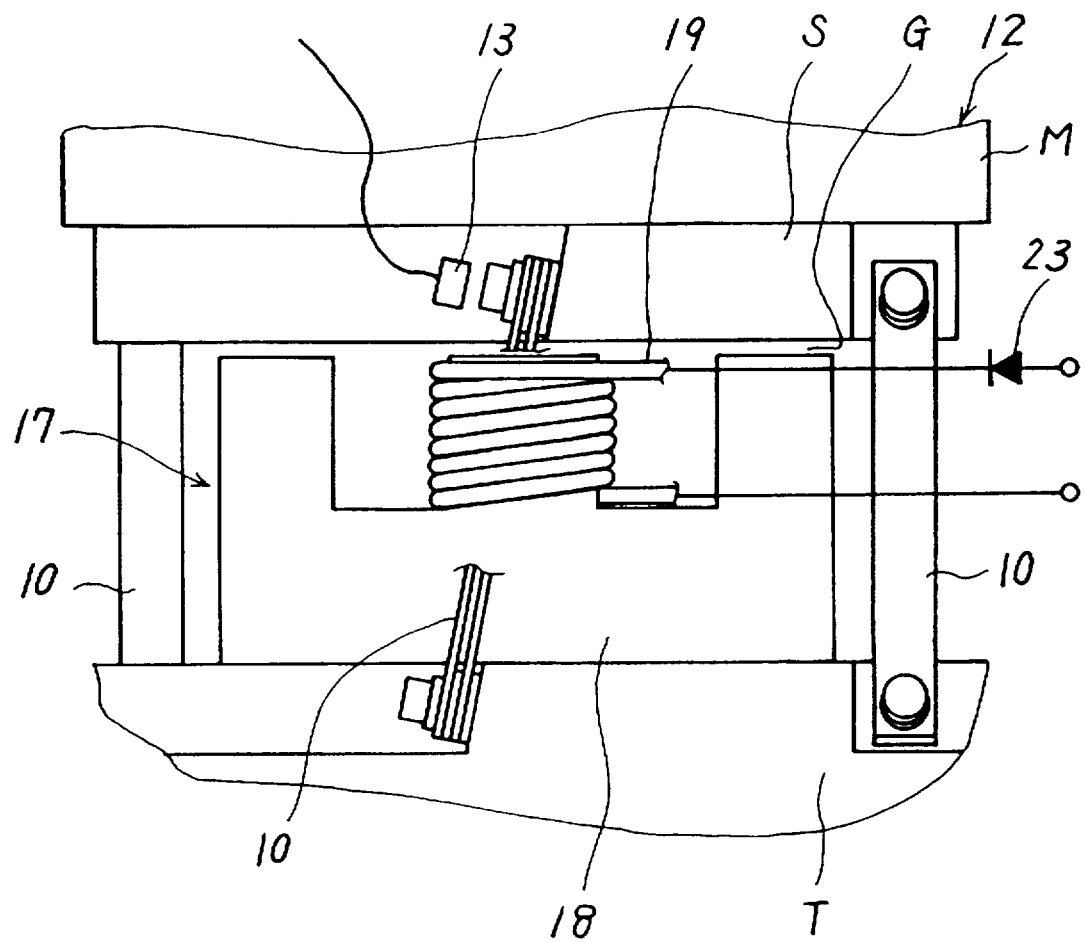

CONTROL SYSTEM FOR VIBRATORY APPARATUS

BACKGROUND OF THE INVENTION

1. Field of the Invention

This invention relates to a control system for a vibratory apparatus which is used, for example, for handling or transporting parts such as bolts, nuts, transistors and so on.

2. Description of the Prior Art

For example, "Vibration Application Technology" published in 1992 by Industrial Research Association, discloses a vibratory apparatus of the self-excited oscillation type. It is shown in FIG. 1. In FIG. 1, a closed loop consists of a vibratory machine 1, a vibration detector 2, a self-excited oscillation controller 3, a power amplifier 4, and a vibratory exciter 5. When the phase lag of the transfer function is equal to 180 degrees at a certain frequency under the opened loop condition, and the gain of the opened transfer function is larger than one (stability limit), a self-excited oscillation can be effected at the above certain frequency in the closed loop. The gain is required to be sufficiently high for improving the rise-up of the self-excited oscillation. For example, it is equal to 100. The gain includes not only the gain of the vibration detector, the gain of the controller and the gain of the power amplifier, but also the input-output conversion gain of the vibratory exciter.

However, when the vibratory exciter 5 is an electromagnet, it has the non-linear or square characteristic which is the relationship between the current flowing through the coil and the attractive force as shown in FIG. 2. Accordingly, the input-output conversion gain or the differential coefficient is equal to zero or nearly equal to zero nearly at the current of zero or within the range shown by a reference mark A in FIG. 2. A high gain cannot be obtained in an opened loop. Thus, a self-excited oscillation cannot be generated. Generally, a self-excited resonance-type vibratory apparatus has the advantage that it automatically follows up a resonance point. However, any control is required for maintaining an amplitude of a vibratory machine at a definite value. When the amplitude is maintained at the definite value by a saturation characteristic of a power amplifier, the output of the power amplifier is rectangular, and therefore, it includes many high frequency components.

A self-excited vibratory apparatus Q as shown in FIG. 3 was disclosed in the Japanese Patent Application No.154599/1986, in consideration of the above-described defects of the Prior Art. FIG. 4 shows a block diagram of transfer functions of an important part of the self-excited vibratory apparatus Q as shown in FIG. 3.

In FIG. 4, a vibratory machine is generally designated by a reference numeral 1', and it is represented by a shown characteristic equation. A vibration detector 2' is arranged adjacent to the vibratory machine 1'. When the vibratory machine 1' is a vibratory parts-feeder, the vibration detector 2' is an eddy current type sensor, and it is arranged adjacent to a leaf spring which combines a bowl (movable part) with a base. The output of the vibration detector 2' is supplied to an amplitude controller 3', and an output of the amplitude controller 3' is supplied to a power amplifier 4'.

On the other hand, an output x of the vibratory machine 1' is supplied to a self-excited oscillation controller 7' which includes an adder 6' and a first order lag element 5'. The output x of the vibratory machine 1' is negatively fed-back to the adder 6'. Since the vibratory machine 1' is self-excited, another input to the adder 6' is zero. The output of the adder 6' is supplied to the first order lag element 5', and further an output of the first order lag element 5' is supplied to the power amplifier 4'.

In the vibratory machine 1', a mass m vibrates at an acceleration, $dx^2/dt^2$. The vibratory velocity of the mass m is equal to $dx/dt$, when the lag element is equal to $1/s$, where s represents a Laplace transform. A damping force $(c \times dx/dt)$ is applied to the mass m, where c represents a viscous coefficient. The "dx/dt" is transferred to a displacement x by the lag element $1/s$. A restoring force kx is further applied to the mass m, where k represents a spring constant of a restoring force of a spring.

The vibratory machine 1' can be schematically represented by such a closed loop. The displacement x lags by 90 degrees behind the force at the resonant frequency. Since the displacement x is made to lag by 90 degrees, by the first order lag element 5' in the self-excited oscillation controller 7'. The phase difference is equal to 180 degrees, in an opened loop. Thus, a self-excited oscillation becomes possible. When a gain $K_0$ of the power amplifier 4' is over a stability limit, the system shown in FIG. 4 can self-excitedly oscillate. The difference between the present amplitude and a predetermined amplitude is detected in an amplitude controller 3'. The gain $K_0$ of the power amplifier 4' is controlled with the output representing the difference. When the difference between the present amplitude and the predetermined amplitude is larger, the gain $K_0$ of the power amplifier 4' is higher. When the vibratory displacement of the vibratory machine 1' reaches the predetermined amplitude, the gain $K_0$ of the power amplifier 4' is brought to the stability limit. As shown in FIG. 5, the relationship between the difference $\Delta r$ and the gain $K_0$ of the power amplifier 4' is linear. When the rise-up characteristic of the self-excited oscillation is made rapid, the gain $K_0$ of the power amplifier 4' should be required to be sufficiently large, since the difference $\Delta r$ is large at the control start. However, the high frequency components or ripples of the output of the vibration detector 2' is greatly amplified by the power amplifier 4'. Thus, the output of the power amplifier 4' varies very much. There is the disadvantage that the vibratory machine cannot be stably self-excitedly oscillated.

FIG. 6 shows a vibratory apparatus of the self-excited oscillation type of the Prior Art. It is generally denoted by a reference numeral 1". A vibratory machine 2" is, for example, a vibratory parts-feeder. A vibration detector 3" of the eddy current type is arranged adjacent to a leaf spring in the vibratory machine 2". An output of the vibration detector 3" is supplied to a self-excited oscillation controller 4". An output of the self-excited oscillation controller 4" is amplified by a power amplifier 5", and the amplified output is supplied to a vibratory exciter 6" which is, for example, the electromagnetic exciter of the vibratory machine 2".

The vibratory machine 2" is self-excitedly oscillated by the self- excited oscillation controller 4". To stop the vibration of the vibratory machine 2", a stop signal is supplied at time t0 as shown in FIG. 7. For example, an electric wire a between the self-excited oscillation controller 4" and the power amplifier 5" or another electric wire b between the power amplifier 5" and the vibration exciter 6" is cut off. Thus, the vibratory machine 2" is stopped. The amplitude of a movable part or a bowl of the vibratory machine 2" is exponentially decreased with time from time t0. In FIG. 7, the bowl is vibrated at a predetermined amplitude till time t0. It requires a considerable time that the amplitude of the bowl is reduced to 0.

A spiral track is formed inside the bowl in the vibratory machine 2". Parts are oriented and posture-rectified along the spiral track in the bowl. It requires a considerable time that the amplitude of the bowl is reduced to zero after time t0 when the stop signal is generated. Accordingly, the parts supply is not stopped at the same time as the time t0. For some time after time t0, the parts continue to be supplied to the next stage. That is often a great disadvantage. The time that the amplitude of the bowl in the vibratory machine 2" is reduced to zero after the stop signal, depends on the damping characteristic of the vibratory machine 2". It is proportional to the velocity of the movable part. It is a resistive force. A force for vibrating the vibratory machine 2" at the resonant frequency increases with a damping coefficient and it causes much loss of energy.

FIG. 8 shows another vibratory apparatus of the forced-vibration type. It is generally denoted by a reference numeral 1A. A current from the commercial supply 7 is supplied to an electromagnetic coil 10 of an electro-magnet 9 in the vibratory parts-feeder 2A which is one example of the vibratory parts-feeder. The vibratory machine 2A is shown in details, in FIG. 8. For example, the frequency of the commercial supply 7 is equal to 50 Hz. It is supplied through a controller 8 to the vibratory parts-feeder 2A. The bowl 11 is oscillated at a predetermined amplitude. Also in the vibratory apparatus of the forced vibration type, a switch is arranged at an electric line c between the commercial supply 7 and the controller 8, or an electric line d between the controller 8 and the electromagnetic coil 10. The switch is turned off to stop the drive of the vibrating parts-feeder 2A. And the bowl 11 is stopped. Also in this case, in the same manner as the vibratory parts-feeder 2A of the self-excited oscillation type, it is transiently vibrated. Accordingly, it requires a considerable time before that the amplitude of the bowl is reduced to 0. Thus, there is the above described disadvantage.

SUMMARY OF THE INVENTION

Accordingly, it is an object to provide a vibratory apparatus which is reliable for handling parts.

In accordance with an aspect of this invention, a vibratory apparatus comprising:

(A) vibratory speed detecting means for detecting a vibratory speed of a vibratory machine;

(B) a self-excited oscillation controller for amplifying the output of said vibratory speed detecting means at a feed-back gain K, receiving the output of said vibratory speed detecting means as a positive feed-back signal;

(C) a power amplifier for power-amplifying the output of said self-excited oscillation controller; and (D) a vibratory exciter receiving the output of said power amplifier for vibrating said vibratory machine, the improvements in which said feed back gain K is changed in accordance with the equation; $K=K_1\Delta r+K_N(\Delta r)^{2N+1}+Kcr$, where $\Delta r$ represents the amplitude difference between a predetermined amplitude and the present amplitude. $K_1$, $K_N$ are constants, N is an integer, and Kcr critical stability gain.

In accordance with another aspect of this invention, a vibratory apparatus comprising:

(A) vibratory displacement detecting means for detecting a vibratory displacement of a vibratory machine;

(B) a self-excited oscillation controller for amplifying the output of said vibratory displacement detecting means at a feed-back gain K, receiving the output of said vibratory displacement detecting means as a negative feed-back signal, and controlling phase lag by integrating element or first order lag element;

(C) a power amplifier for power-amplifying the output of said self-excited oscillation controller; and (D) a vibratory exciter receiving the output of said power amplifier for vibrating said vibratory machine, the improvements in which said feed back gain K is changed in accordance with the equation; $K=K_1\Delta r+K_N(\Delta r)^{2N+1}+Kcr$, where $\Delta r$ represents the amplitude difference between a predetermined amplitude and the present amplitude. $K_1$, $K_N$ are constants, N is an integer, and Kcr critical stability gain.

In accordance with a further aspect of this invention, a vibratory apparatus comprising:

(A) vibratory displacement detecting means for detecting a vibratory displacement of a vibratory machine;

(B) a self-excited oscillation controller for amplifying the output of said vibratory displacement detecting means at a feed-back gain K, receiving the output of said vibratory displacement detecting means as a negative feed-back signal;

(C) a power amplifier for power-amplifying the output of said self-excited oscillation controller; and (D) an electromagnet receiving the output of said power amplifier and generating a magnetic-attractive force for vibrating said vibratory machine, the improvements in which said feed back gain K is changed in accordance with the equation; $K=K_1\Delta r+K_N(\Delta r)^{2N+1}+Kcr$, where $\Delta r$ represents the amplitude difference between a predetermined amplitude and the present amplitude. $K_1$, $K_N$ are constants, N is an integer, and Kcr critical stability gain.

In accordance with a still further aspect of this invention, a vibratory apparatus comprising:

(A) vibratory displacement detecting means for detecting a vibratory displacement of a vibratory machine;

(B) a self-excited oscillation controller for amplifying the output of said vibratory displacement detecting means at a feed-back gain K, receiving the output of said vibratory displacement detecting means as a negative feed-back signal;

(C) a power amplifier for power-amplifying the output of said self-excited oscillation controller; and (D) an electromagnet receiving the output of said power amplifier and generating a magnetic-attractive force for vibrating said vibratory machine, the improvements in which a diode is connected to the electromagnetic coil of the electromagnet.

In accordance with a still further aspect of this invention, a vibratory apparatus comprising:

(A) vibratory displacement detecting means for detecting a vibratory displacement of a vibratory machine;

(B) a self-excited oscillation controller for amplifying the output of said vibratory displacement detecting means at a feed-back gain K, receiving the output of said vibratory displacement detecting means as a negative feed-back signal;

(C) a power amplifier for power-amplifying the output of said self-excited oscillation controller; and (D) an electromagnet receiving the output of said power amplifier and generating a magnetic-attractive force for vibrating said vibratory machine, the improvements in which said electromagnet includes a permanent magnet.

In accordance with a still further aspect of this invention, a vibratory apparatus comprising:

(A) vibratory displacement detecting means for detecting a vibratory displacement of a vibratory machine;

(B) a self-excited oscillation controller for amplifying the output of said vibratory displacement detecting means at a feed-back gain K, receiving the output of said vibratory displacement detecting means as a negative feed-back signal;

(C) a power amplifier for power-amplifying the output of said self-excited oscillation controller; and (D) an electromagnet receiving the output of said power amplifier and generating a magnetic-attractive force for vibrating said vibratory machine, the improvements in which a constant DC current is flowed into the electromagnetic coil of said electro-magnet.

In accordance with a still further aspect of this invention, a vibratory apparatus comprising:

(A) vibratory speed detecting means for detecting a vibratory speed of a vibratory machine;

(B) a self-excited oscillation controller for amplifying the output of said vibratory speed detecting means at a first feed-back gain, receiving the output of said vibratory speed detecting means as a positive feed-back signal;

(C) a power amplifier for power-amplifying the output of said self-excited oscillation controller; and (D) a vibratory exciter receiving the output of said power amplifier for vibrating said vibratory machine;

(E) a closed loop being formed by said vibratory machine, said vibratory speed detecting means, said self-excited oscillation controller, said power amplifier and said vibratory exciter, the improvements in which said closed loop is opened when said vibratory machine is stopped, and the output of said vibratory speed detecting means is amplified as a negative feed-back signal at a second feed-back gain, and supplied to said vibratory exciter.

In accordance with a still further aspect of this invention, a vibratory apparatus comprising:

(A) vibratory displacement detecting means for detecting a vibratory displacement of a vibratory machine;

(B) a self-excited oscillation controller for amplifying the output of said vibratory displacement detecting means at a first feed-back gain, receiving the output of said vibratory displacement detecting means as a negative feed-back signal and for controlling phase lag by an integrating element or first-order lag element;

(C) a power amplifier for power-amplifying the output of said self-excited oscillation controller; and (D) a vibratory exciter receiving the output of said power amplifier for vibrating said vibratory machine;

(E) a closed loop being formed by said vibratory machine, said vibratory displacement detecting means, said self-excited oscillation controller, said power amplifier and said vibratory exciter, the improvements in which said closed loop is opened when said vibratory machine is stopped, and the output of said vibratory displacement detecting means is differentiated and amplified as a negative feed-back signal at a second feed-back gain, and supplied to said vibratory exciter.

In accordance with a still further aspect of this invention, a vibratory apparatus comprising:

(A) vibratory displacement detecting means for detecting a vibratory speed of a vibratory machine;

(B) a self-excited oscillation controller for amplifying the output of said vibratory displacement detecting means at a first feed-back gain, receiving the output of said vibratory displacement detecting means as a negative feed-back signal;

(C) a power amplifier for power-amplifying the output of said self-excited oscillation controller; and (D) an electro-magnet receiving the output of said power amplifier for vibrating said vibratory machine;

(E) a closed loop being formed by said vibratory machine, said vibratory displacement detecting means, said self-excited oscillation controller, said power amplifier and said electro-magnet, the improvements in which said closed loop is opened when said vibratory machine is stopped, and the output of said vibratory displacement detecting means are twice differentiated, or once differentiated and phase-advanced by 90 degrees, and amplified as a negative feed-back signal at a second feed-back gain, and supplied to said electro-magnet.

In accordance with a still further aspect of this invention, a vibratory apparatus comprising:

(A) a vibratory exciter receiving an electric power from an AC power source;

(B) a vibratory machine of the enforced vibration type, receiving a vibrational force from said vibratory exciter; and (C) a vibratory speed detecting means for detecting the vibrational speed of said vibratory machine, the improvement in which said vibratory exciter is cut off from said AC power source, and the output of said vibratory speed detecting means is amplified and supplied to said vibratory exciter as a negative feed-back signal when said vibratory machine is stopped.

In accordance with a still further aspect of this invention, a vibratory apparatus comprising:

(A) a vibratory exciter receiving an electric power from an AC power source; (B) a vibratory machine of the enforced vibration type, receiving a vibrational force from said vibratory exciter; and (C) a vibratory displacement detecting means for detecting the vibrational displacement of said vibratory machine, the improvement in which said vibratory exciter is cut off from said AC power source, and the output of said vibratory displacement detecting means is amplified as a negative feed-back signal and, phase-controlled for phase lag by an integrating or first-order lag element and supplied to said vibratory exciter.

In accordance with a still further aspect of this invention, in a vibratory apparatus comprising: an exciting mechanism for imparting to said vibratory apparatus an electric power from an electric power source, the improvement in which vibratory speed detecting means is arranged adjacent to said movable part or attached to said movable part and said exciting mechanism is cut off from said electric power source when said vibratory apparatus is stopped, and the output of said vibratory speed detecting means is supplied directly to said exciting mechanism or amplified to said vibratory mechanism as a negative feed-back signal.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 10 is an enlarged view of a vibratory exciter in FIG. 9.

DESCRIPTION OF THE PREFERRED EMBODIMENT

Figure 9:
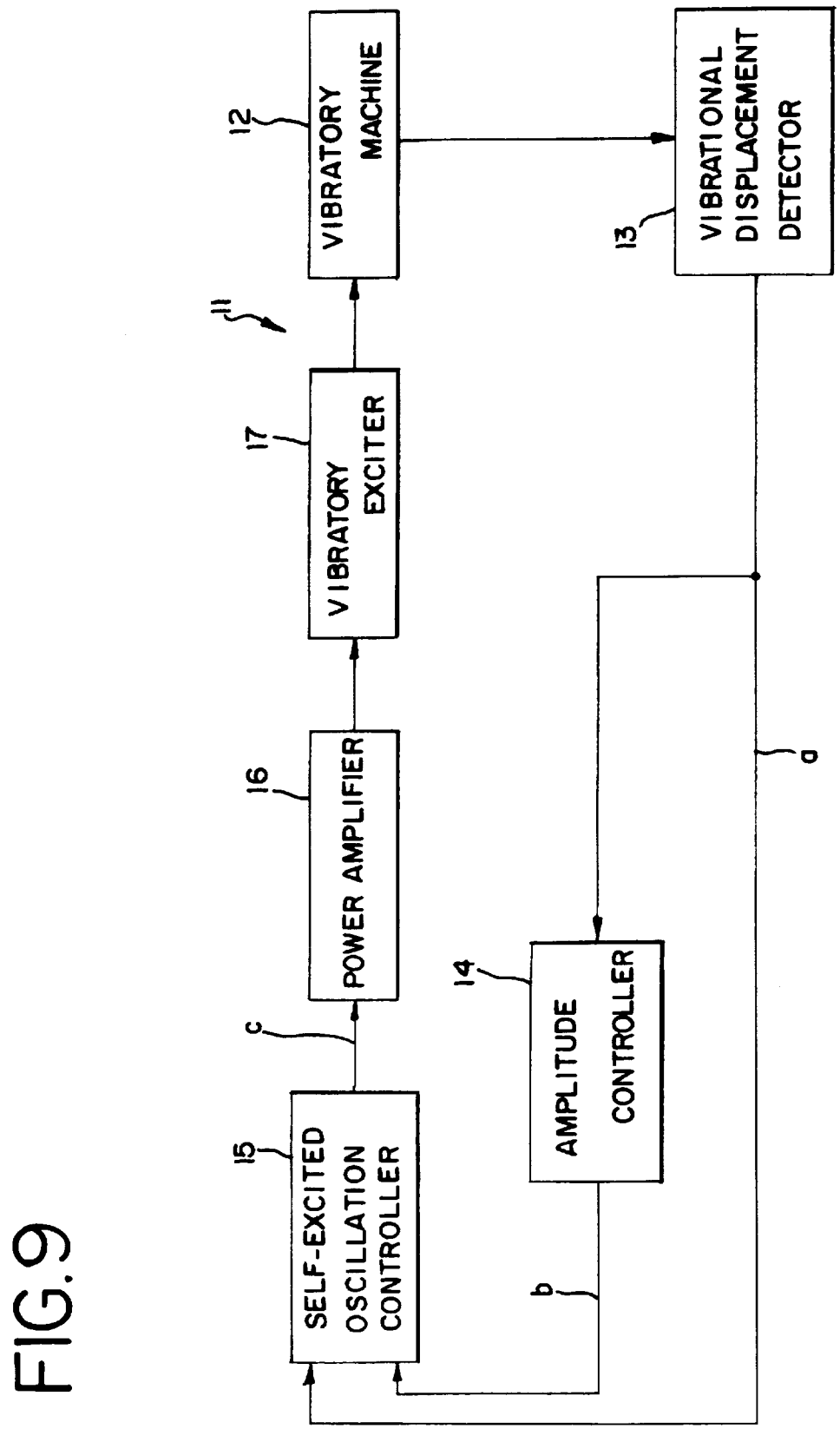
FIG. 9 is a block diagram of a vibratory apparatus according to a first embodiment of this invention.

FIG. 9 shows a self-excited vibratory apparatus of the electro-magnet exciter type, according to a first embodiment of this invention. It is generally designated by a reference numeral 11. A vibratory machine (vibratory parts-feeder) 12 is a vibratory parts-feeder in this embodiment, the details of which is shown in FIG. 10.

A vibrational displacement detector 13 is arranged adjacent to the vibratory parts-feeder 12. An output of the vibrational displacement detector 13 is supplied to an amplitude (displacement) controller 14 which has the well-known construction. A predetermined amplitude is set in the amplitude controller 14. The output of the vibrational displacement detector 13 is compared with the predetermined amplitude in the amplitude controller 14. An output of the amplitude controller 14 is supplied to an electric line b, which corresponds to the difference between the predetermined amplitude and the output of the vibrational displacement detector 13.

Figure 14:
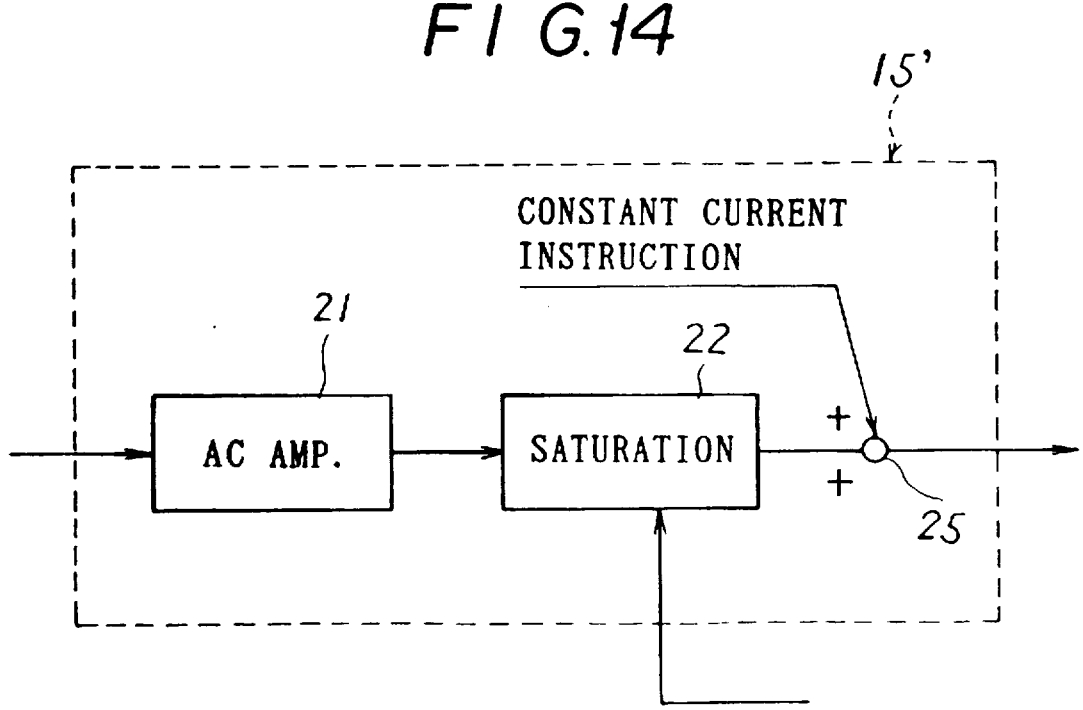
FIG. 14 is a block diagram of an important part of a vibratory apparatus according to a third embodiment of this invention.

A self-excited oscillation controller 15 includes an alternative current amplifier 21 and a saturation limiter 22, as shown in FIG. 14. An output of the controller 15 is supplied to an electric line c, and amplified by a power amplifier 16. An amplified output of the power amplifier 16 is supplied to a vibratory exciter 17.

As shown in FIG. 10, the vibratory exciter 17 is of the electro-magnet exciter type. It consists of an E-shaped stationary electromagnet 18, an electro-magnetic coil 19 wound on the stationary electromagnet 18 and an armature S facing to the stationary electromagnet 18, spaced by an air gap G. A movable part M is combined with a stationary part T by obliquely arranged leaf springs 10. The vibrational displacement detector 13 is arranged adjacent to the leaf springs 10. It is of the eddy current type, and the output of the detector 13 is supplied to the amplitude controller 14. In this embodiment, a diode 23 is connected to the electro-magnetic coil 19. A self-exciting resistance of such a magnetic circuit is changed with the air gap G between the armature S and the stationary electro-magnet 18. However, the system is vibrated at the natural frequency. Accordingly, the phase difference between the force and the displacement is equal to 90 degrees. And the phase difference between the voltage and the current is equal to the angle of 90 degrees. In the closed loop as shown in FIG. 9, the output of the vibrational displacement detector 13 is negatively fed-back to the self-excited oscillation controller 15 through the electric line a. Thus, the general phase difference is equal to 180 degrees. Accordingly, the system can be self-excitedly oscillated.

Figure 11:
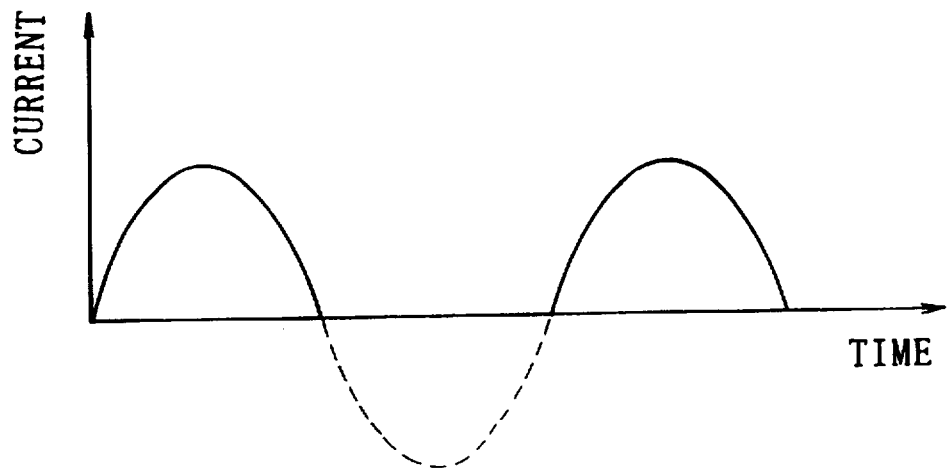
FIG. 11 is a chart for showing operation of the first embodiment.
Figure 12:
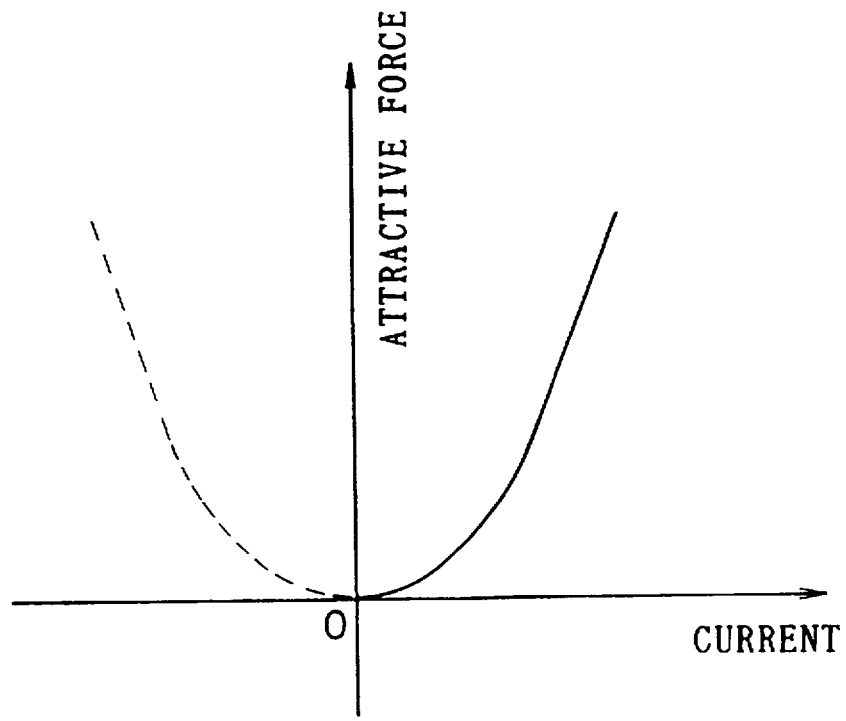
FIG. 12 is another chart for explaining operation of the first embodiment.

There has been described the construction of the self-excited vibratory apparatus of the electromagnet type according to the first embodiment of this invention. Next, operation of this construction will be described. Although not shown, a DC power source is connected to the power amplifier 16 through an electric switch. By closing the electric switch, the vibratory machine is self-excitedly vibrated. According to this embodiment, since the diode 23 is connected to the electromagnetic coil 19 of the vibratory exciter 17, the electric current changes with time as shown in FIG. 11. It is imsymmetrical with respect to the time axis. The relationship between the current and attracting force is squarely non-linear. When the current is very small, the differentiation coefficient is nearly equal to zero at the original point 0 in the Prior Art. However as shown in FIG. 11, when the current changes, according to this embodiment, the differentiation coefficient is equal to a certain value, since the relationship between the current and the attracting force or the input/output conversion gain has the same sign (+). Accordingly, the system starts to rapidly self-excitedly oscillate and the vibratory machine 12 can self-excitedly vibrate.

According to this embodiment, the self-excited oscillation controller 15 includes the saturation limiter 22. It receives the output of the amplitude controller 14 and the amplitude of the limiter level varies with the difference between them. Accordingly, the vibratory part of the vibratory machine 12 vibrates at the predetermined amplitude set in the amplitude controller 14. Although there has not been described in the construction, the vibratory exciter 17 has ideally the phase lag of 90 degrees, but it has actually a phase lag shifted slightly from 90 degrees. Accordingly, phase lagging means may be added to the self-excited oscillation controller 15. Thus, in the closed loop system as shown in FIG. 9, the output of the vibrational displacement detector 13 can be negatively fed-back to the output line of the vibrational displacement detector 13 accurately at the phase lag of 180 degrees. Thus, the vibratory machine 12 can resonantly oscillate and thus the follow-up control can be effected.

Figure 13:
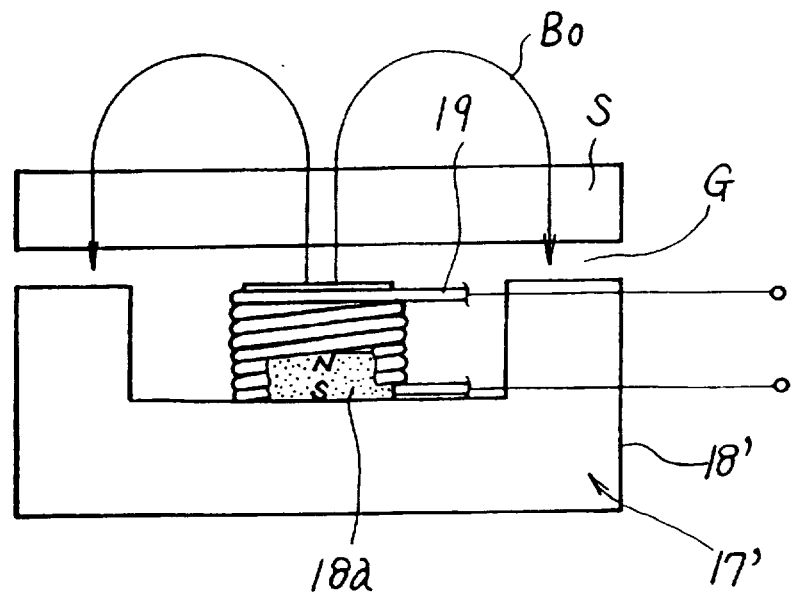
FIG. 13 is a side view of a vibratory exciter according to a second embodiment of this invention.

FIG. 13 shows a vibratory exciter 17' according to a second embodiment of this invention. Parts which correspond to those in FIG. 10, are denoted by the same reference numerals, the description of which will be omitted.

Figure 15:
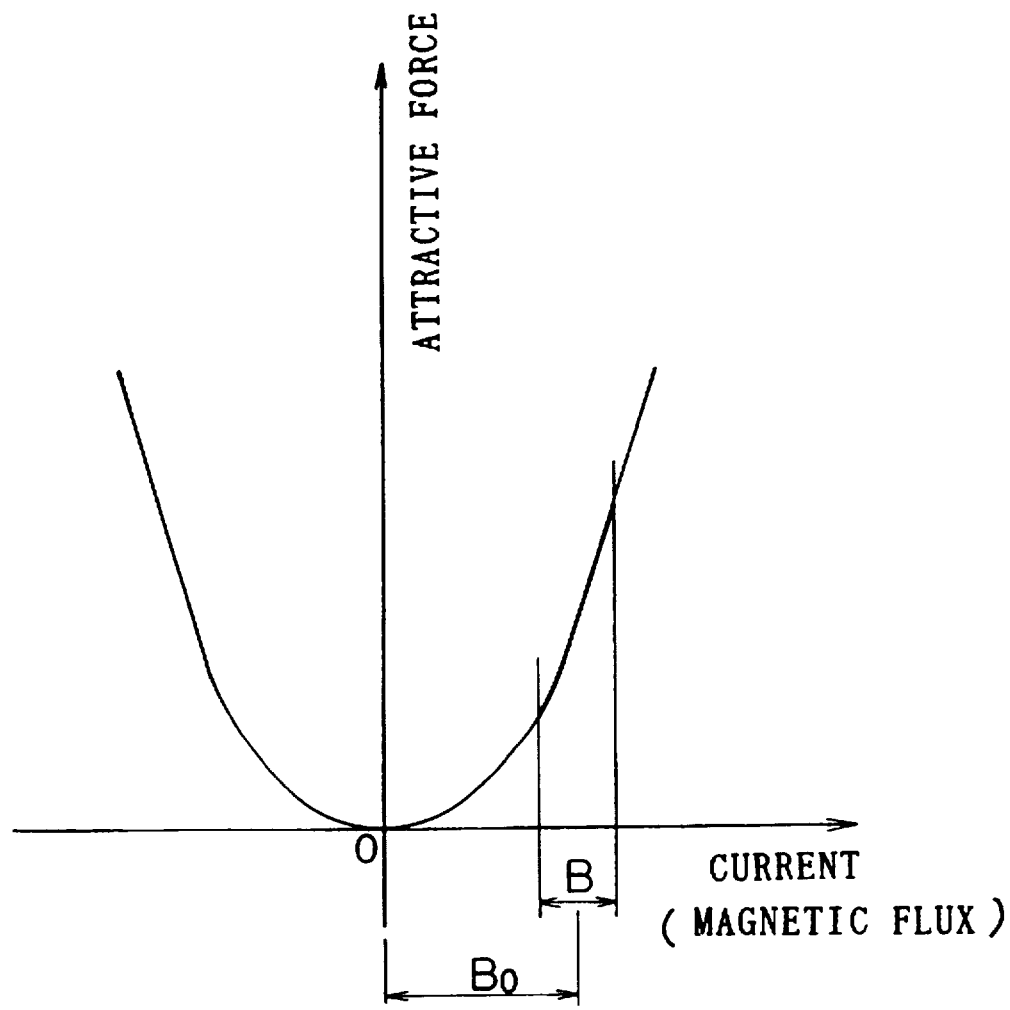
FIG. 15 is a chart for explaining the second embodiment of this invention.

A stationary electromagnet 18' according to this embodiment includes a permanent magnet 18a which is formed integrally there-with. Accordingly, a stationary magnetic flux $B_0$ generates as shown by the arrow. Accordingly, even when the current flowing through the electromagnetic coil 19 is equal to 0, some attractive force is generated when a small current flows through the electromagnetic coil 19 within the region B in the square characteristic as shown in FIG. 15. Accordingly, the average input/output conversion gain is not equal to zero within the B region.

The vibratory machine 12 can start easily to self-excitedly oscillate. And it can stably oscillate. Thus, the stationary magnetic flux $B_0$ from the permanent magnet 18a is added to the changing part B from the magnetic flux due to the small current flowing through the electro-magnet coil 19. Thus, when the detecting current of the detector 13 and the small current due to noise or the like flow through the electric-magnetic coil 19, they fluctuate in the positive region and so the average value of the input/output gain is not equal to 0. Thus, the self-excited oscillation starts. On the other hand, when the stationary magnetic flux $B_0$ is not imparted, the magnetic flux is equal to 0, and the input/output conversion gain is equal to 0 and so the self-excited oscillation does not start, since the small current changes near the original point 0.

FIG. 14 shows a self-excited oscillation controller 15' according to a third embodiment of this invention. It includes the alternative current amplifier 21 and a saturation limiter 22. An output of the saturation limiter 22 is supplied to an adder 25. A constant DC is supplied as a constant current instruction to the adder 25. The DC is flowed through the electro-magnetic coil 19. The differentiate coefficient (input-output conversion gain) of the attractive force is within the region B in the current-attractive force characteristics shown in FIG. 15. Accordingly, an self-excited oscillation can be surely and stably started, although the electro-magnetic excitation system has the non-linear (square) characteristics.

Figure 16:
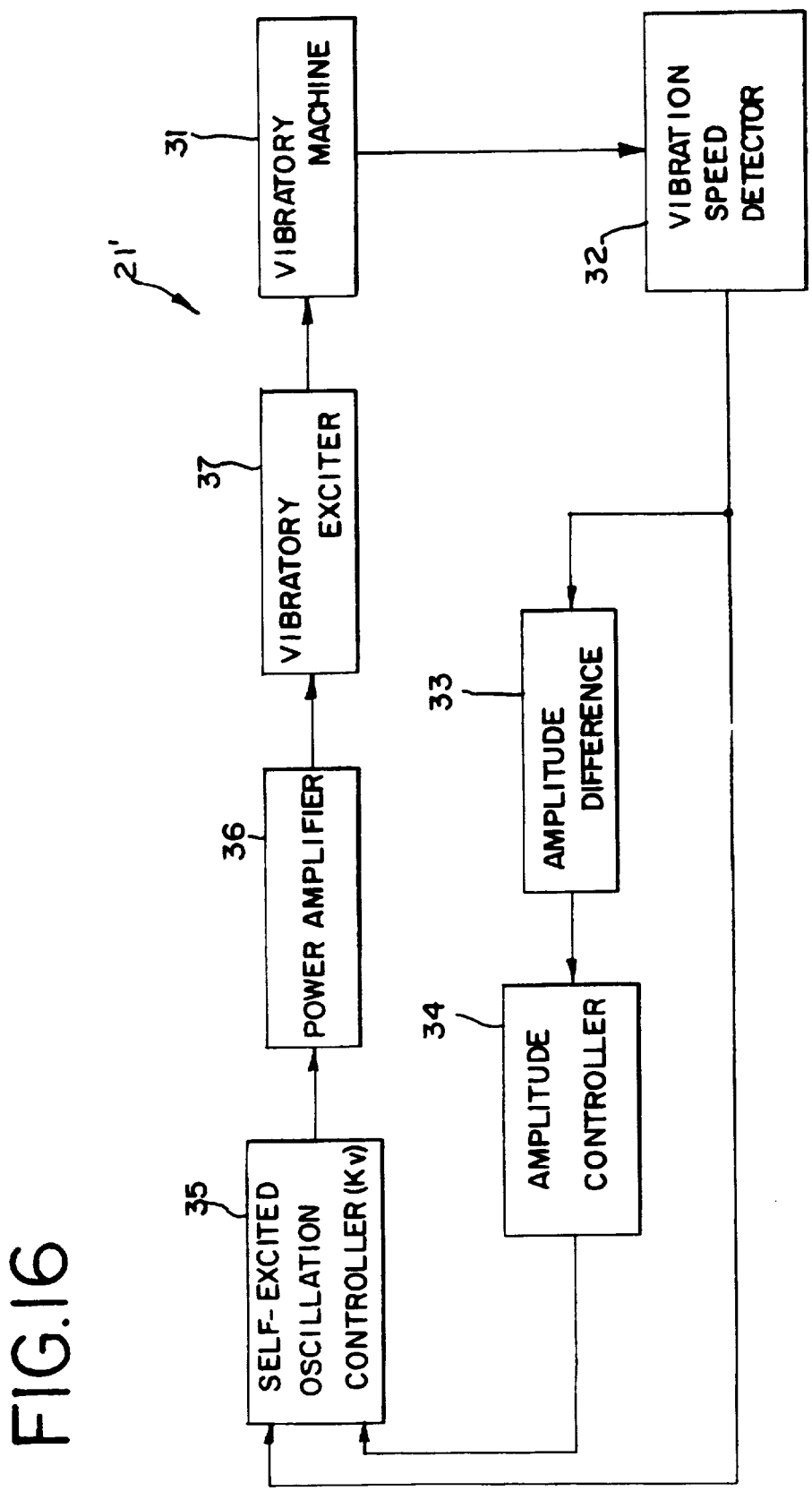
FIG. 16 is a block diagram of a vibratory apparatus according to a fourth embodiment of this invention.
Figure 17:
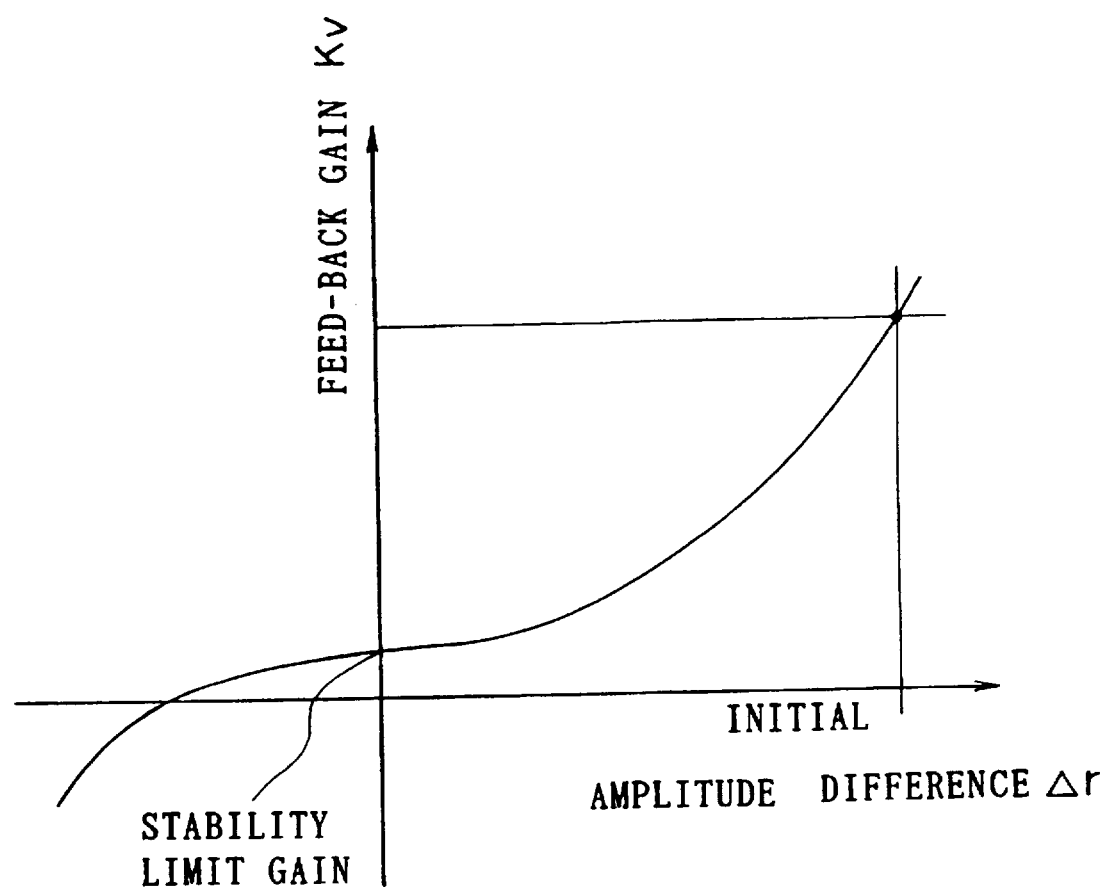
FIG. 17 is a chart for explaining operation of the fourth embodiment.

FIG. 16 shows a self-excited type vibratory apparatus 21' according to a fourth embodiment of this invention. In FIG. 16, a vibratory machine 31 represents a vibratory parts-feeder. However, it may be another vibratory machine. A vibratory exciter 37 imparting exciting force is not of the electric-magnetic type exciter, but is of the piezo electric type or the moving coil type. Accordingly, between an output of a power amplifier 36 and an output of the vibratory exciter 37 there is no phase difference. A vibration speed detector 32 is attached to the movable part of the vibratory machine 31 or arranged adjacent to the vibratory machine 31. The vibration speed detector 32 consists of an amplitude detector and differentiator or it consists of a vibratory acceleration detector and an integrator. The output of the vibration speed detector 32 is integrated in the amplitude difference 33. Thus, the amplitude is detected and it is supplied to an amplitude controller 34. It includes a comparator, and a predetermined amplitude value is set in the amplitude controller 34. The output of the amplitude difference 33 is supplied to another terminal of the comparator in the amplitude controller 34. Thus, the amplitude difference Δr as the comparison result is supplied to the self-excited oscillation controller 35. It includes an alternative current amplifier. The DC component of the input is cut and the alternative current component is amplified. The feedback gain K is so designed as to be controlled by the output of the amplitude controller 34. The relationship between the amplitude differences Δr and the feedback gain K is as shown in FIG. 17. The gain curve changes in accordance with the feedback gain equation, $K=K_1 \Delta r + K_3 \Delta r^3 + Kcr$, where $K_1$, $K_3$ represent constants, and $Kcr$ represents a stability limit gain. Thus, the gain curve is a cubic (three order) curve. Accordingly, when the amplitude difference Δr is large, the gain K is very large.

Figure 1:
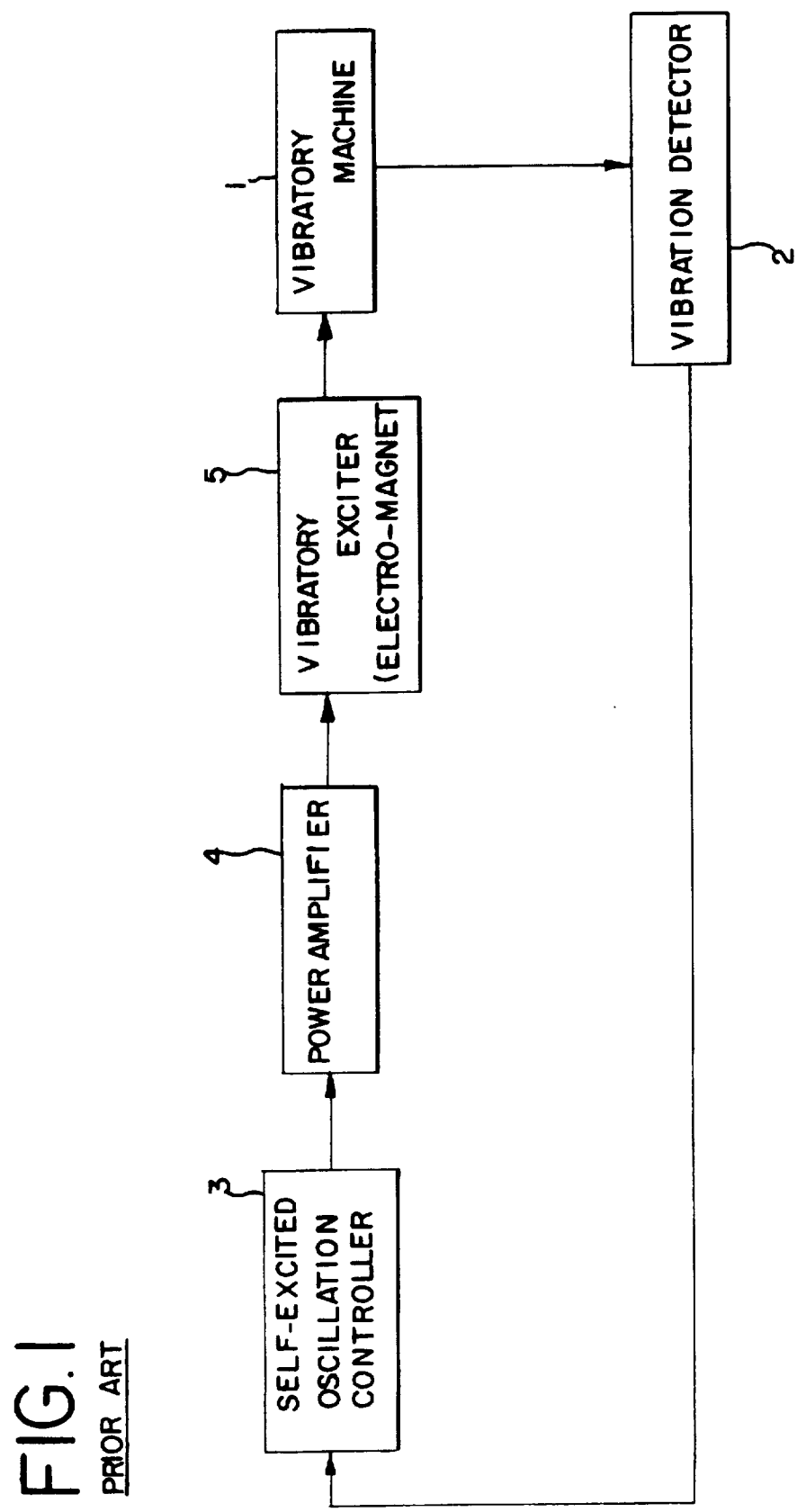
FIG. 1 is a block diagram of a vibratory apparatus of one Prior Art.
Figure 2:
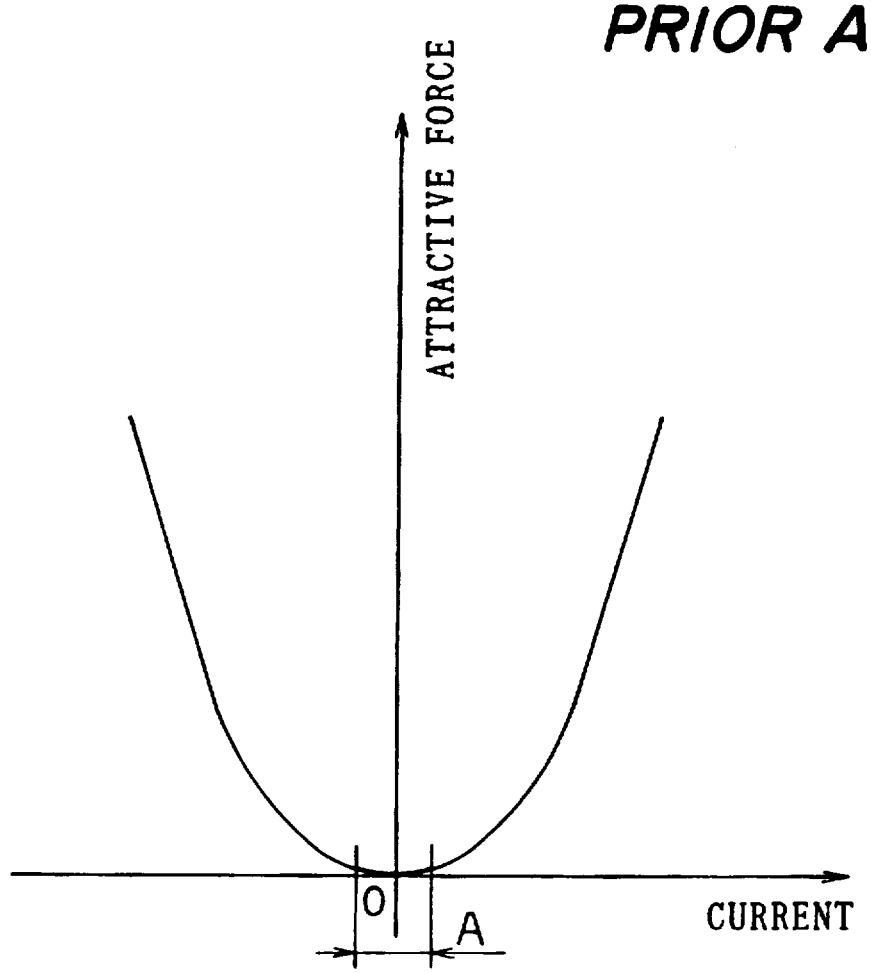
FIG. 2 is a chart for explaining operation of the Prior Art.
Figure 3:
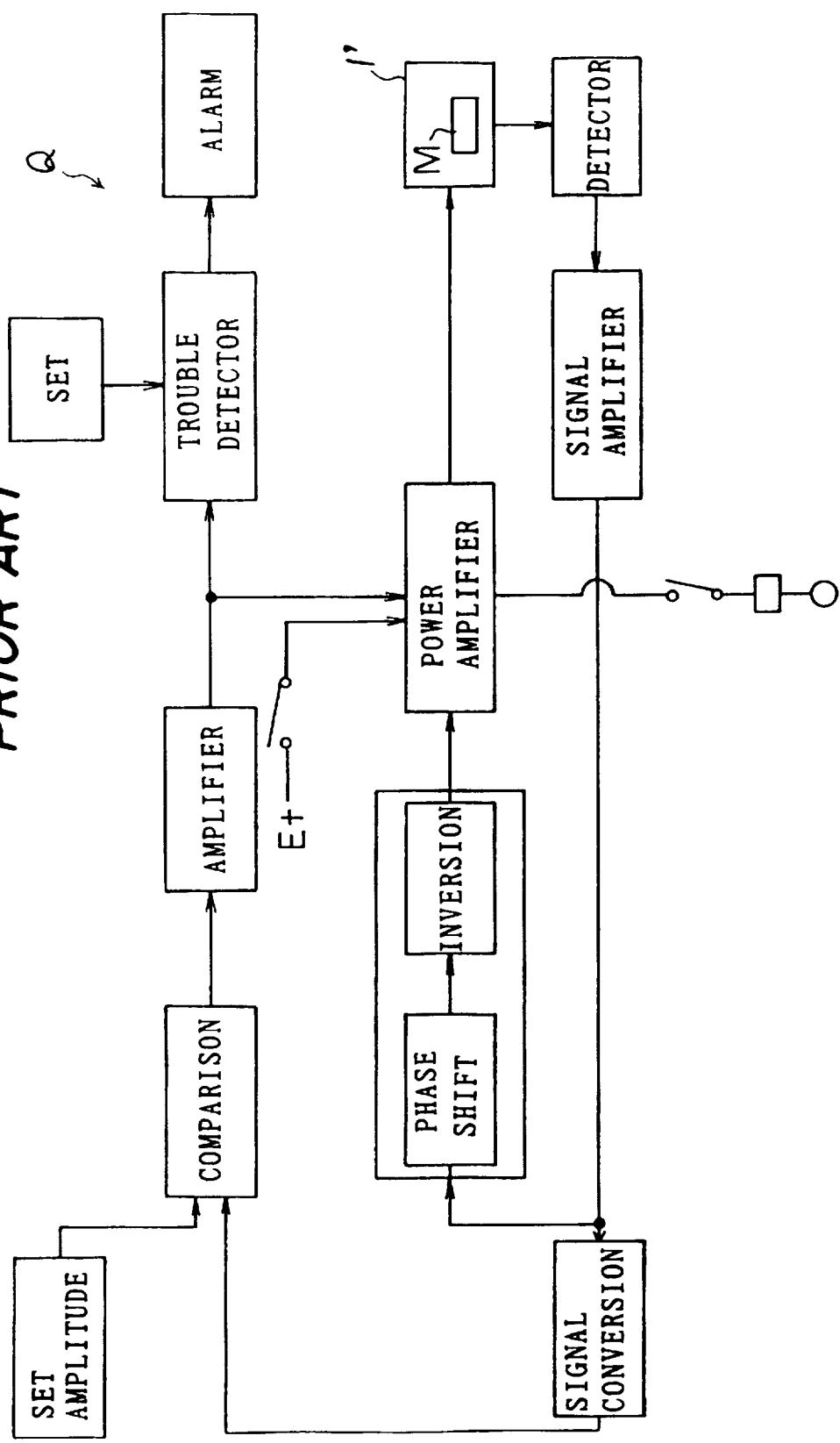
FIG. 3 is a block diagram of a vibratory apparatus of another Prior Art.
Figure 4:
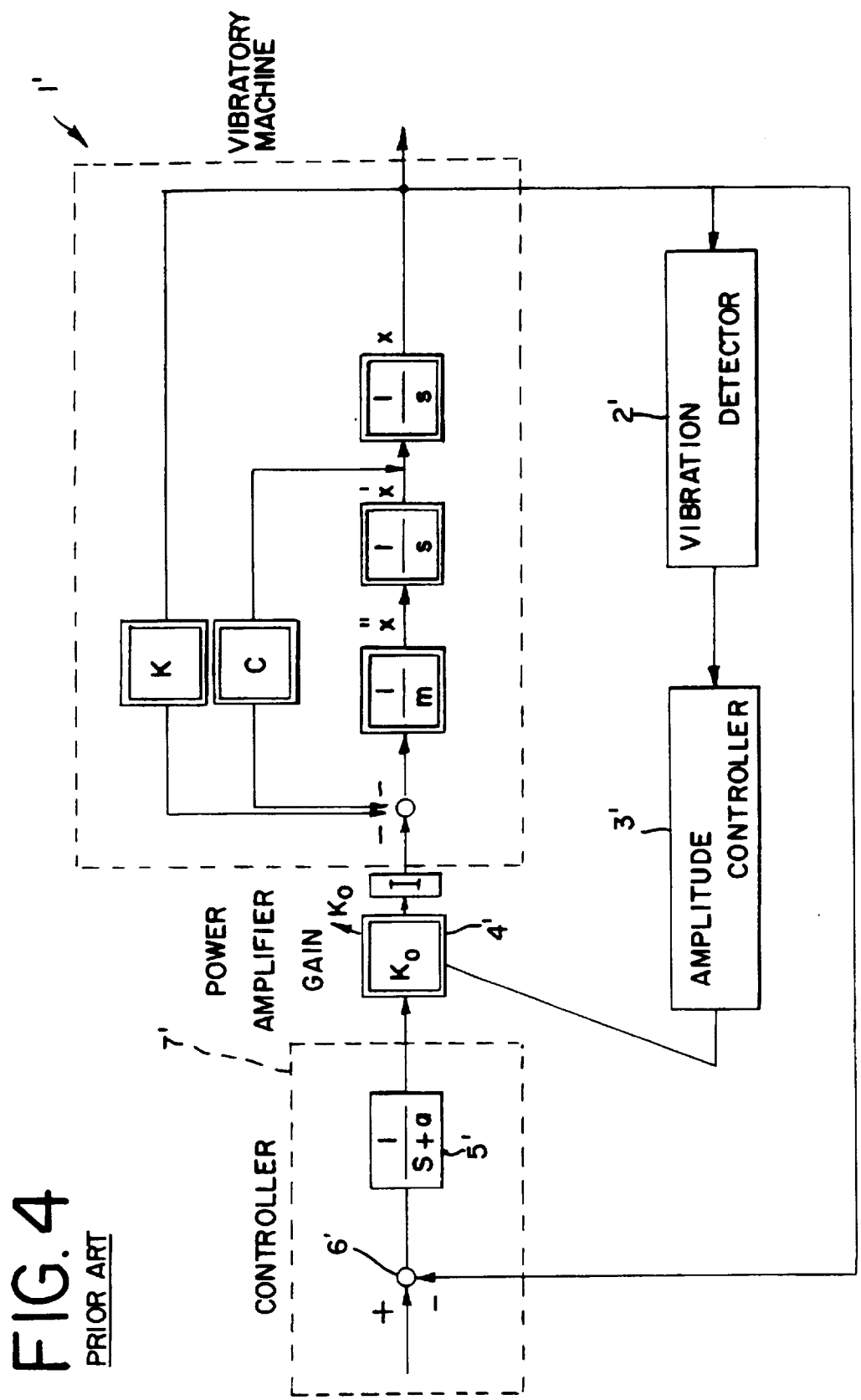
FIG. 4 is a block diagram of an important part of the other Prior Art.
Figure 5:
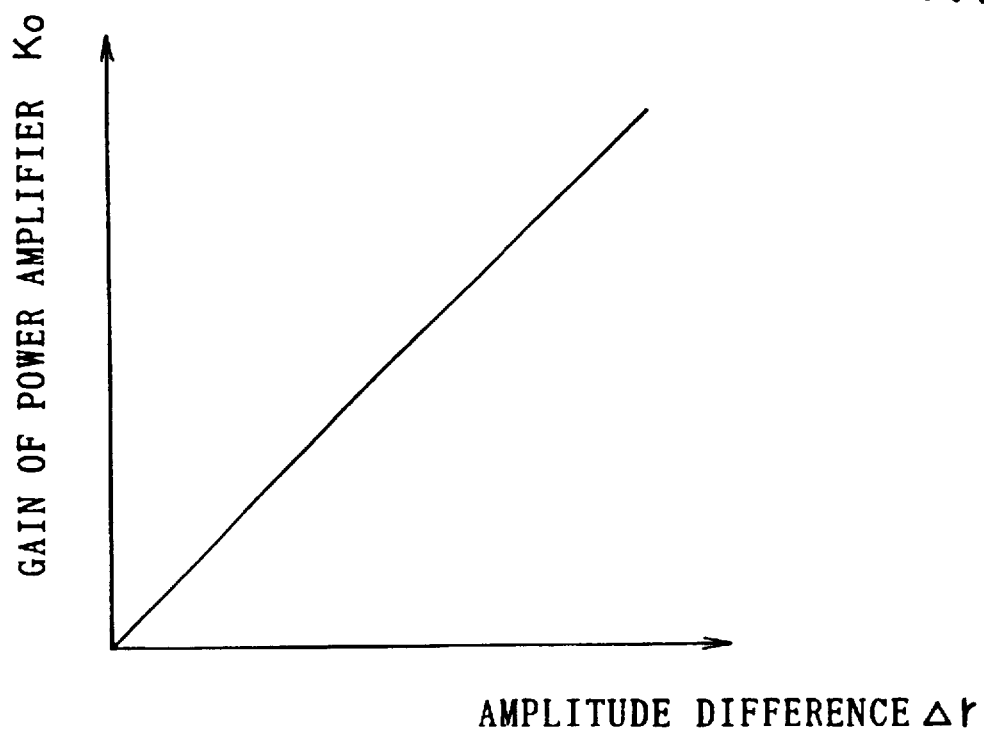
FIG. 5 is a chart for explaining operation of the other Prior Art.
Figure 6:
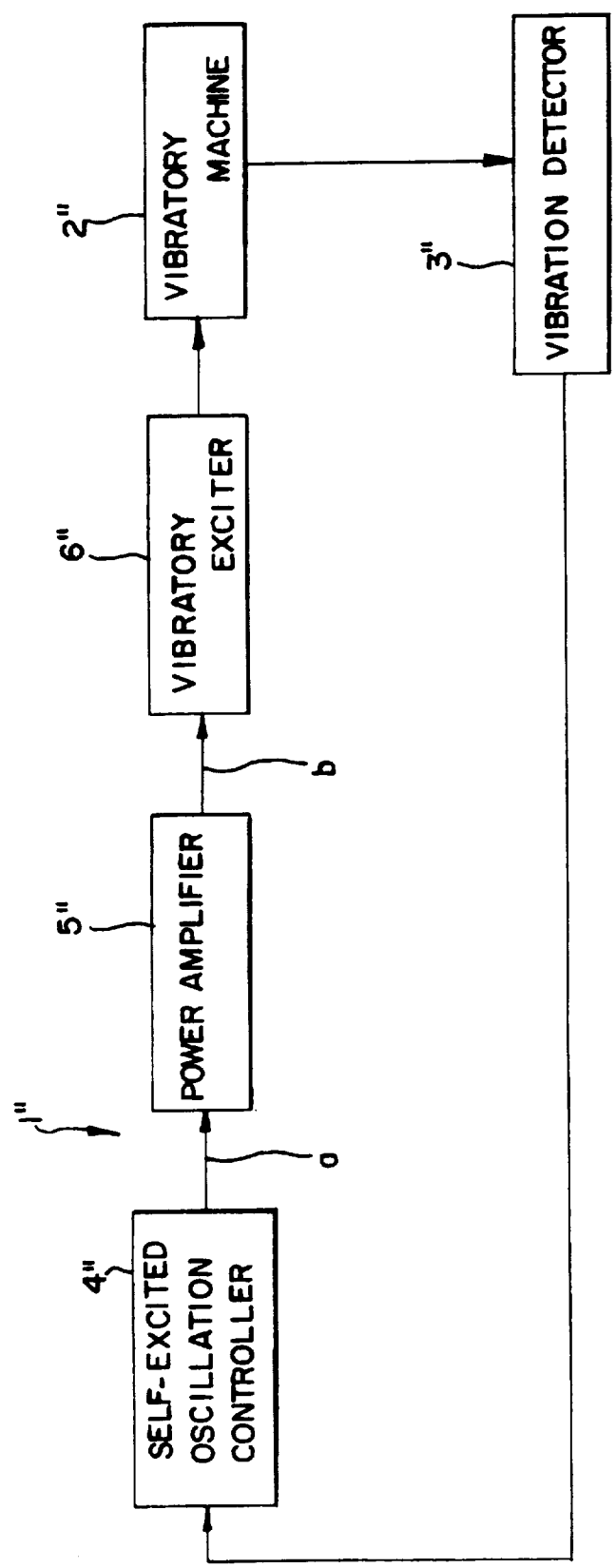
FIG. 6 is a block diagram of a further Prior Art.
Figure 7:
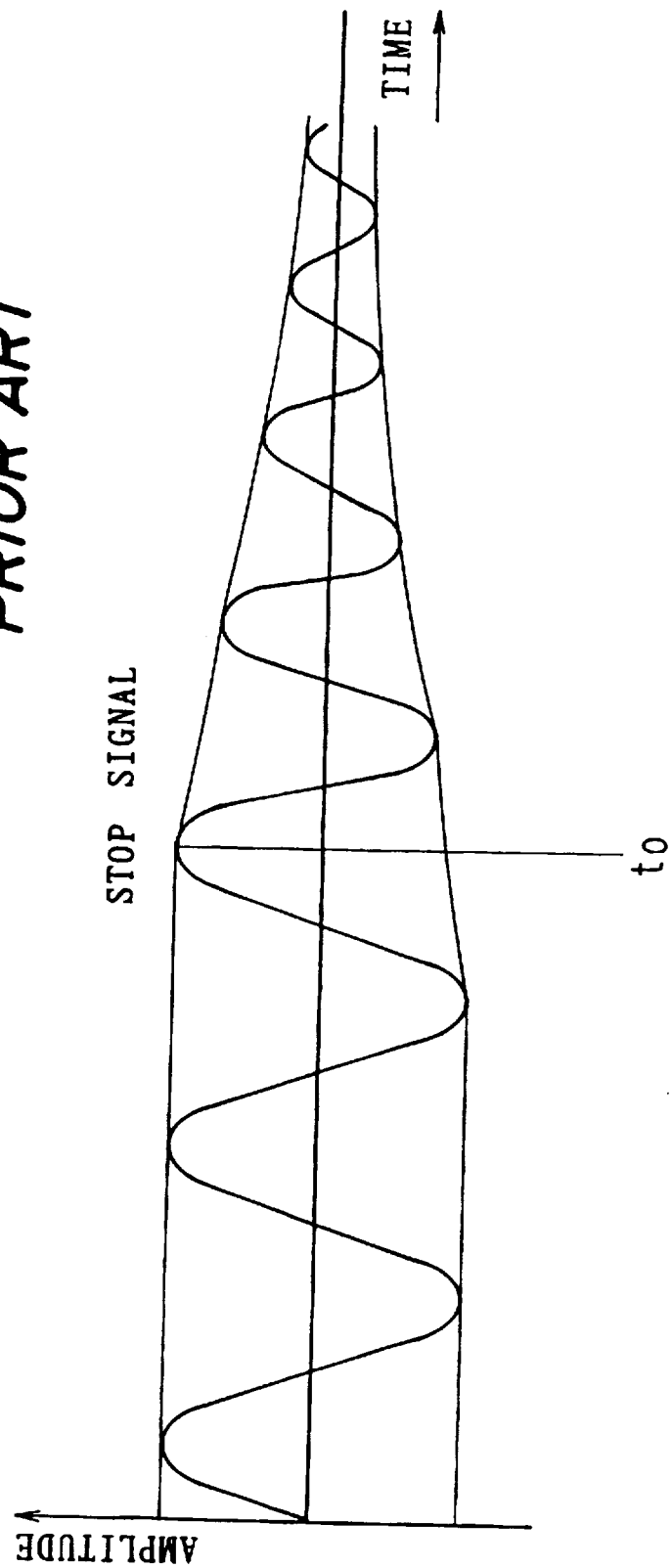
FIG. 7 is a time chart for explaining the further Prior Art.
Figure 8:
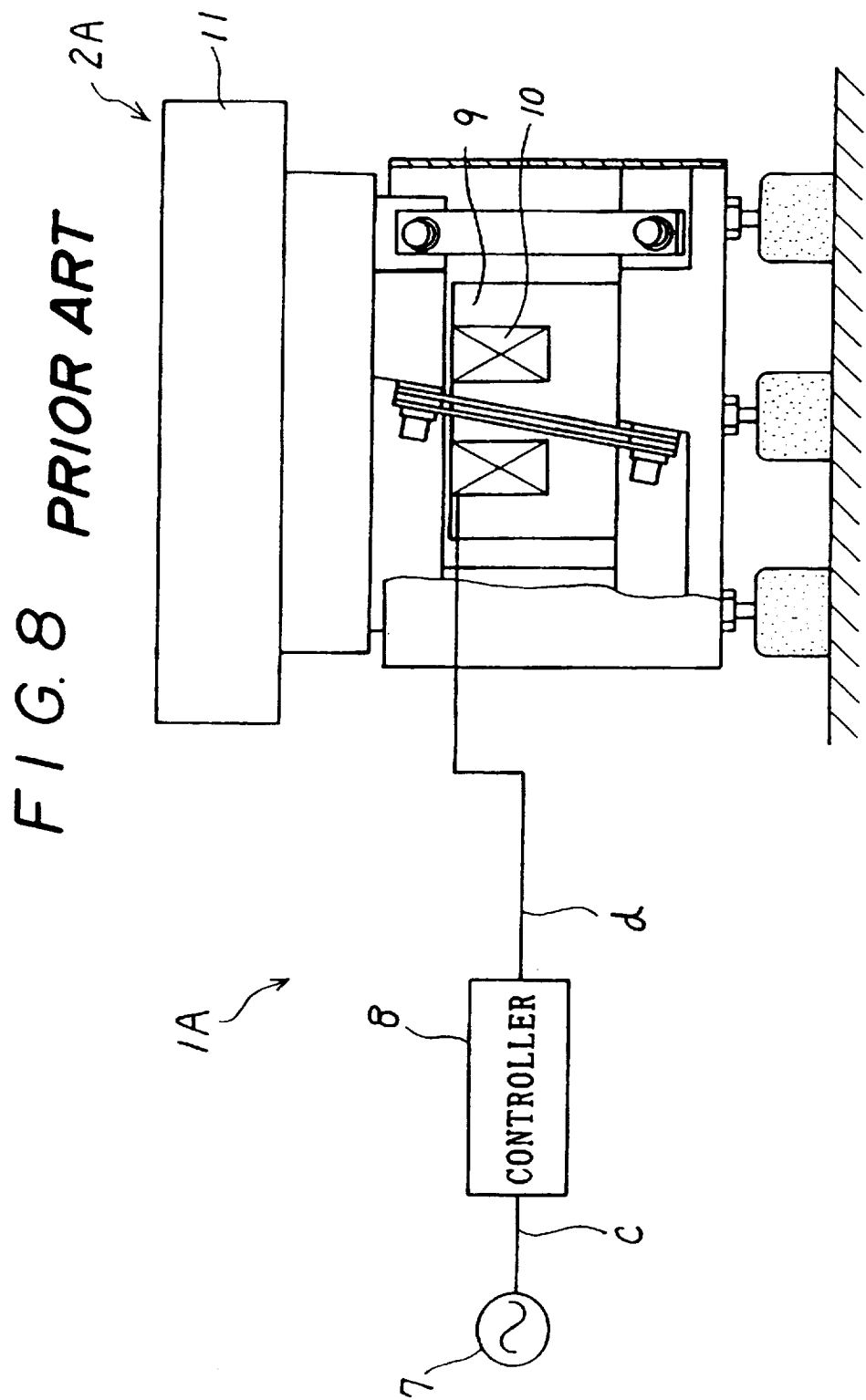
FIG. 8 is a side view of a vibratory apparatus of a further Prior Art.

There has been described an arrangement of this embodiment. Next, operations will be described. Although not shown, a DC power switch is connected to the power amplifier 36. At the self-excited oscillation drive of the vibratory machine 31, the not-shown DC power switch is closed to put the power amplifier 36 into the operative condition. At the same time, the self-excited oscillation controller 35, the amplitude controller 34 and so on, are put into the operative condition. The amplitude of the movable part of the vibratory machine 31 is equal to zero at the control start. Thus, the amplitude difference Δr is maximum. In other words, the initial value of the amplitude difference Δr is equal to (the predetermined amplitude–0). In the Prior Art, the amplitude difference Δr is DC-amplified or PID-amplified. The feedback gain $K_0$ of the power amplifier is linearly increased in the relationship of $K=Kp\Delta r$ as shown in FIG. 5. Accordingly, the feedback gain $K_0$ is maximum at the control start. Thus, the rise up characteristic of the self-excited oscillation rises up. The ripple components superimposed on the output of the amplitude difference 33 are also amplified and so the feedback gain $K_0$ cannot be maintained within the stability of limit. The gain varies much. Accordingly, the output of the power amplifier 16 varies much.

On the other hand, according to this invention, the feedback gain K is represented by the non-linear equation. The second term, $K_3(\Delta r)^3$ decides mainly the feedback gain K at the control start and so the self-excited oscillation can be rapidly obtained and the gain K deciding the behavior of the vibratory parts-feeder can be smaller near the stability limit. Thus, the influence of ripple components can be reduced much.

Figure 18:
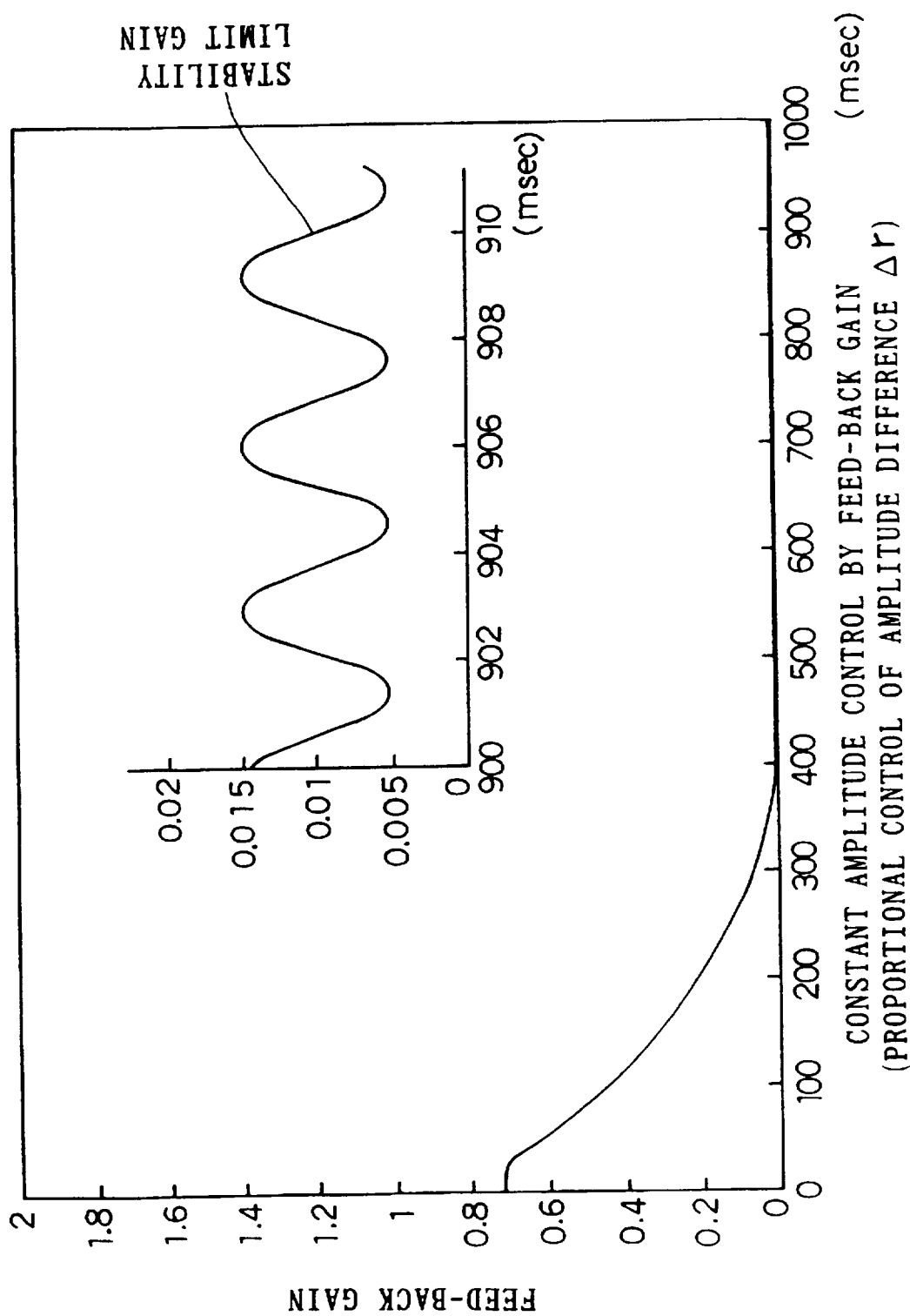
FIG. 18 is a chart for explaining the comparison between this invention and the Prior Art
Figure 19:
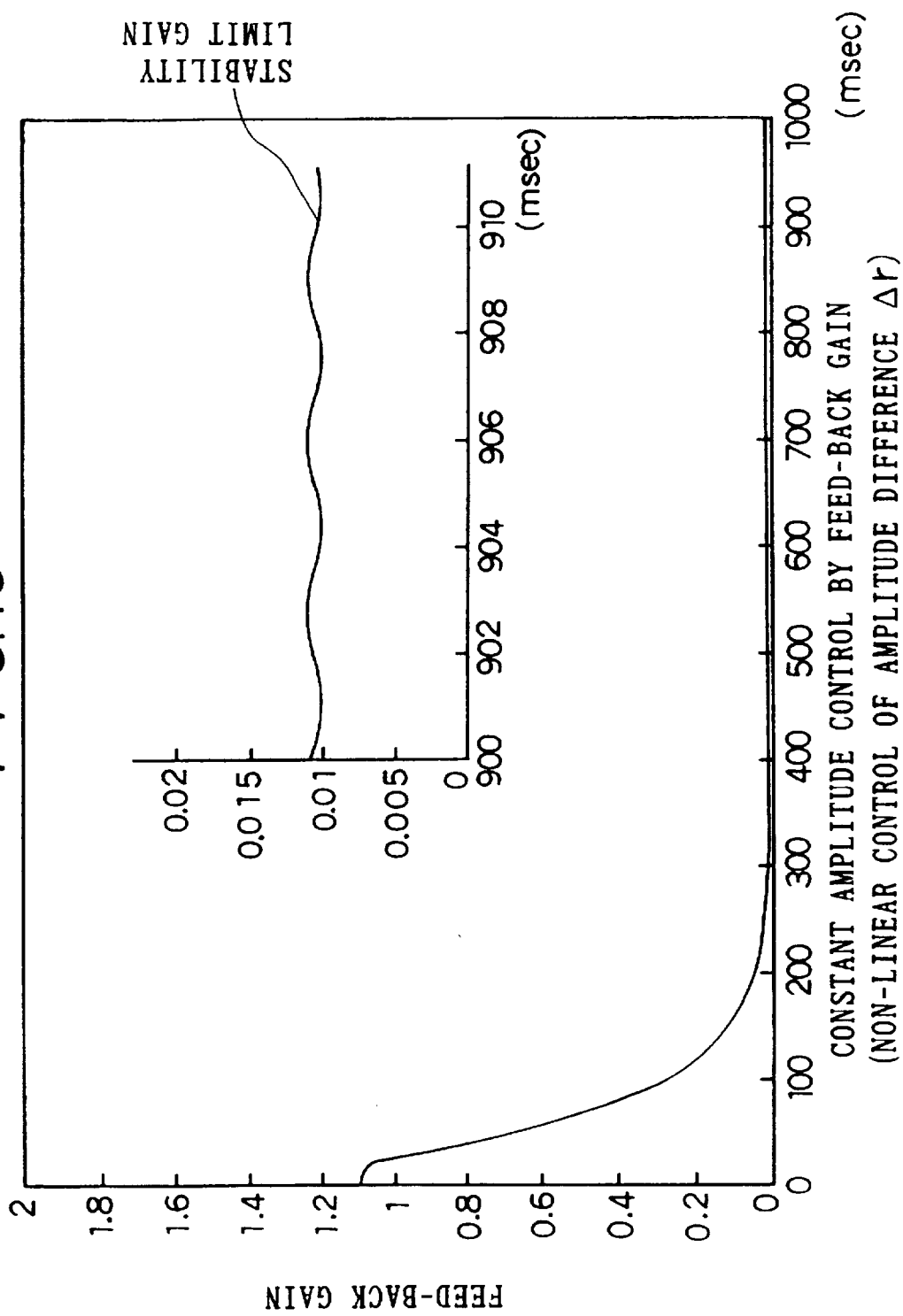
FIG. 19 is a chart for explaining the operation of the fourth embodiment of this invention.

FIG. 18 shows the change of the feedback gain of the Prior Art. The gain changes much in 900 msec to 910 msec after turning on the switch. The gain K is sinusoidarily changed much. On the other hand, FIG. 19 shows the change of the gain feedback gain K according to this invention. As shown in FIG. 19, the stability limit gain changes little in 900 msec to 910 msec after turning on the electric switch. It is proved that the ripple component of the output of the amplitude difference 33 has little influence.

Figure 20:
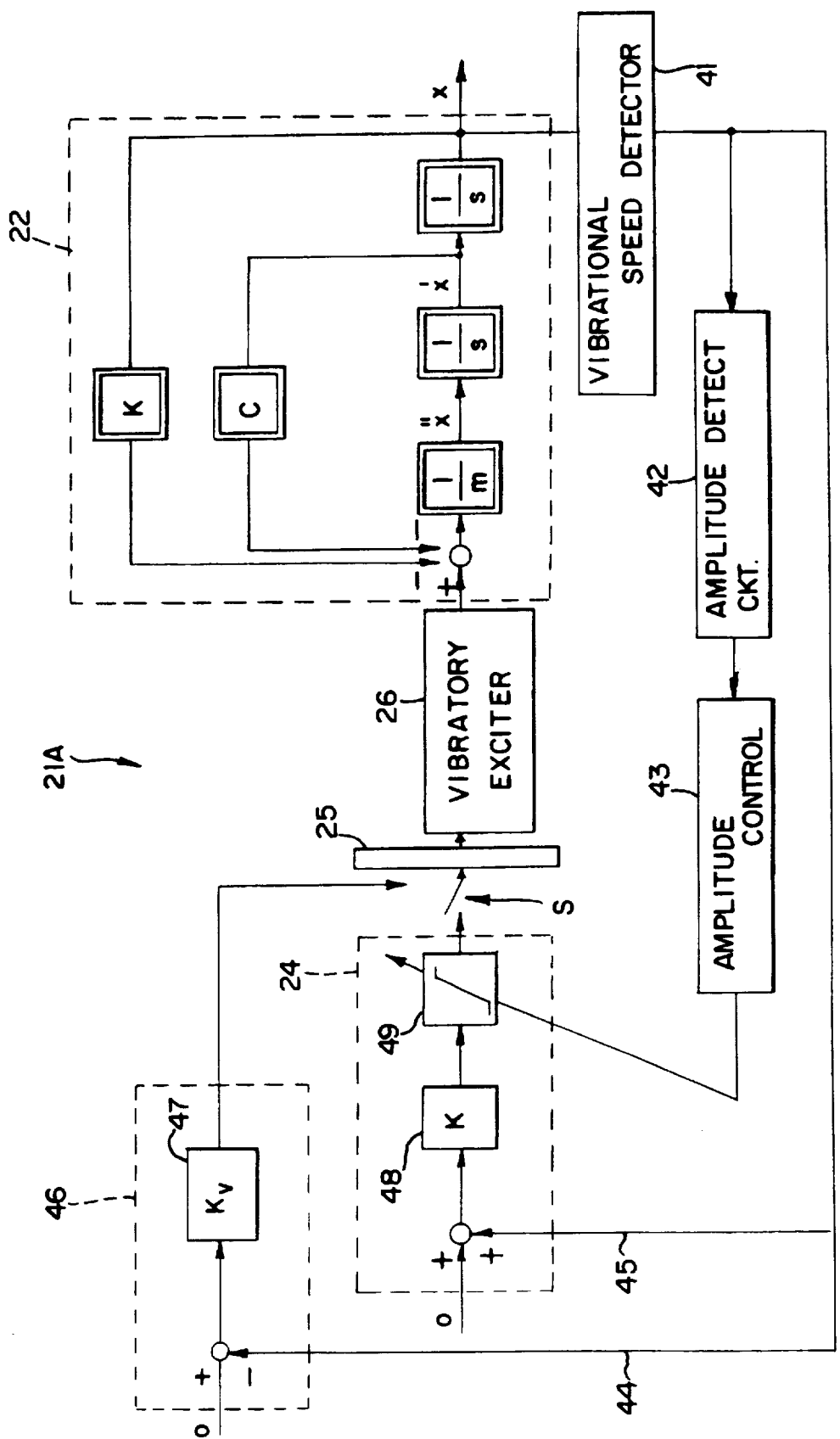
FIG. 20 is a block diagram of vibratory apparatus according to a fifth embodiment of this invention.

FIG. 20 shows a vibratory apparatus according to a fifth embodiment of this invention. It is generally denoted by a reference numeral 21A. The vibratory machine 22 is a vibratory parts-feeder. Its vibrational equation is represented by $(mdx^2/dt^2 + cdx/dt + kx = K\, dx/dt)$. The $(dx^2/dt^2)$ can be obtained by multiplying $1/m$ by $(mdx^2/dt^2)$, where m represents the mass of the movable parts. in the above equation. By multiplying 1/s. where s represents Lapplus transfer element. (dx/dt) or velocity can be obtained. A damping or viscous coefficient is multiplied by (dx/dt). It is negatively fed-back to such a vibrational system. Further by multiplying (1/s), a vibrational displacement x can be obtained. "kx", where k represents a spring constant, functions as the negative feedback. A velocity (dx/dt) is detected by a vibrational speed detector 41 in the vibratory system. An acceleration may be detected instead of the vibrational speed. At this case. the value is once integrated. Or an amplitude may be detected instead of them. At this case. the value is once differentiated. The output of the vibrational speed detector 41 is integrated in an amplitude detecting circuit 42 and it is supplied to an amplitude controller 43. A self-excited oscillation controller 24 is so constructed as in the Prior Art. It includes an alternative current amplifier 48 and a saturation limiter 49. An output of the vibrational speed detector 41 is supplied through an electric-wire 44 to a stop apparatus 46 according to this invention. In this embodiment, a power amplifier 47 has a gain factor Kv. A change-over switch S is connected to an output terminal of the stop apparatus 46 or a self-excited oscillation controller 24. According to this embodiment, a movable contact of the change-over switch S is connected through a power amplifier 25 to a vibratory exciter 26. It is connected to an electric magnetic coil of the electric-magnetic in the vibratory exciter 26.

An amplitude controller 43 includes a comparator. A predetermined amplitude is set at one input terminal of the comparator, and the output terminal of the amplitude detecting circuit 42 is connected to another input terminal of the comparator in the amplitude controller 43. The saturation limiter 49 of the self-excited oscillation controller 24 is controlled in accordance with the amplitude difference between the present amplitude and the predetermined amplitude. The output of the vibrational speed detector 41 is positively fed-back through an electric wire 45 to the self-excited oscillation controller 24 and further it is negatively fed-back through an electric wire 44 to the stop apparatus 46. There has been described construction. Next, operation will be described.

When the vibratory machine 22 is driven, the change-over switch S is closed at the side of the self-excited oscillation controller 24. Thus, the output of the vibrational speed detector 41 is positively fed-back to the self-excited oscillation controller 24. Accordingly, the vibratory machine 22 is self-excitedly oscillated. The vibratory exciter (electromagnet) 26 has the phase lag of 90 degrees. The vibratory machine 22 is vibrated at the resonant point. The phase difference between the force and displacement is equal to 90 degrees.

Accordingly, in the self-excited oscillation controller 24, although the phase is neither advanced nor lagged, the phase difference of 180 degrees can be obtained in the closed loop between the output terminal of the vibrational speed detector 41 and the input terminal of the controller 24. Thus, the self-excited oscillation can be stably effected. The amplitude of the vibratory machine 22 is always detected by the amplitude detecting circuit 42. Thus, the level of the saturation limiter 49 in the self-excited oscillation controller 24 is so controlled as to maintain the bowl of the parts-feeder at a constant amplitude. As the result, the vibratory machine 22 is vibrated at the predetermined amplitude.

When the vibratory machine 22 is stopped, the change-over switch S is connected to the side of the stop apparatus 46. Now, the output of the vibrational speed detector 41 is supplied to the stop apparatus 46. It is negatively fed-back to the stop apparatus 46. The output of the vibrational speed detector 41 is negatively fed-back to the stop apparatus 46 and it is amplified by the gain Kv and it is supplied to the vibratory exciter 26. The force from the vibratory exciter 26 is opposite to the direction of the vibration of the vibratory machine 22. Thus, the vibratory machine 22 stops in a short time in comparison with the case of the natural damping force in the Prior Art.

Figure 21:
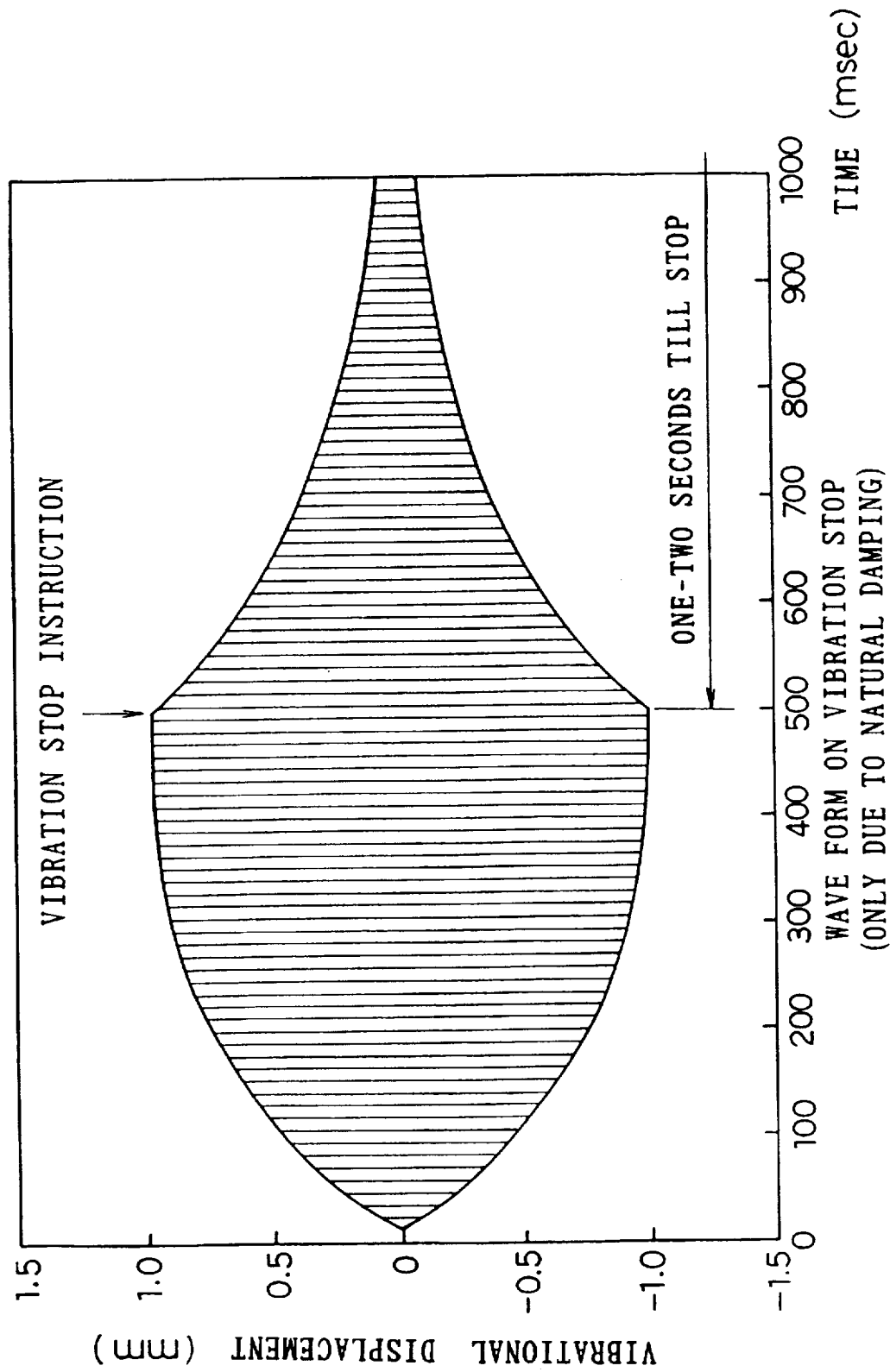
FIG. 21 is a chart for explaining the comparison between the Prior Art and this invention.
Figure 22:
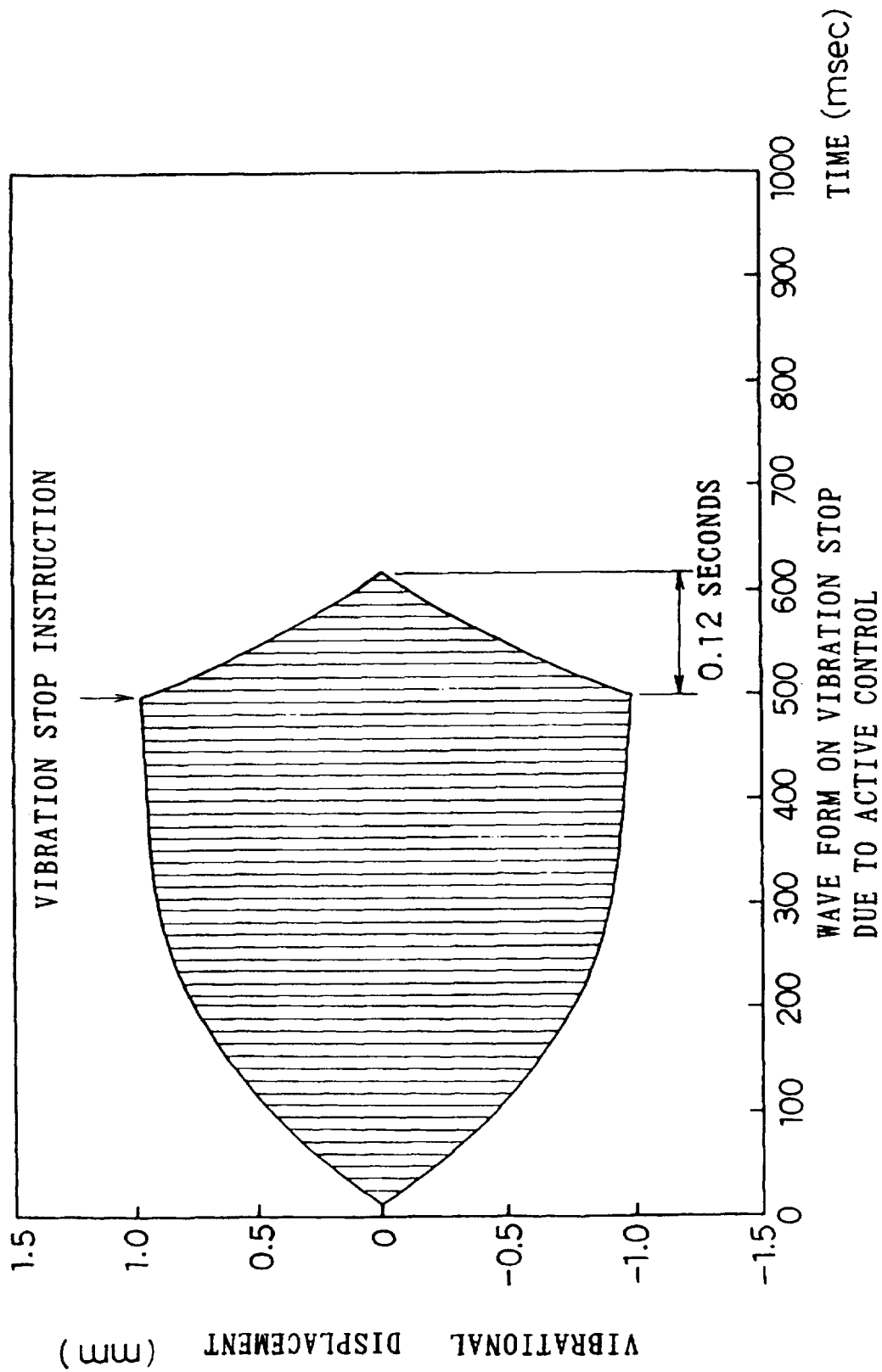
FIG. 22 is a chart for explaining the operation of the fifth embodiment of this invention.

FIG. 21 and FIG. 22 show the effect of this invention in simulation. FIG. 21 shows a wave shape of a vibrational displacement in the Prior Art, in this case. The vibratory machine 22 starts self-excitedly to oscillate at time 0 msec. The amplitude is increased as shown in FIG. 21 and it is maintained at the predetermined value. When the vibration stop instruction is supplied at time 500 msec, the vibrational displacement changes in the shown manner. It requires about one or two seconds that the movable part of the vibratory machine 22 stops. In this case, the damping factor is equal to 0.005 and the resonant magnification is equal to 100.

FIG. 22 shows an effect of this embodiment in simulation. The self-excited oscillation can be effected in the same manner as the Prior Art. When the vibration stops instruction is supplied at time 500 msec, the vibratory machine stops in 0.12 seconds. The time when the amplitude of the movable part is reduced to zero after the vibration stop instruction, is equal to about 1/10 of the corresponding time of the Prior Art. Thus, the vibratory parts-feeder can be almost instantaneously stopped and so the parts supply to the next stage can be rapidly stopped.

Figure 23:
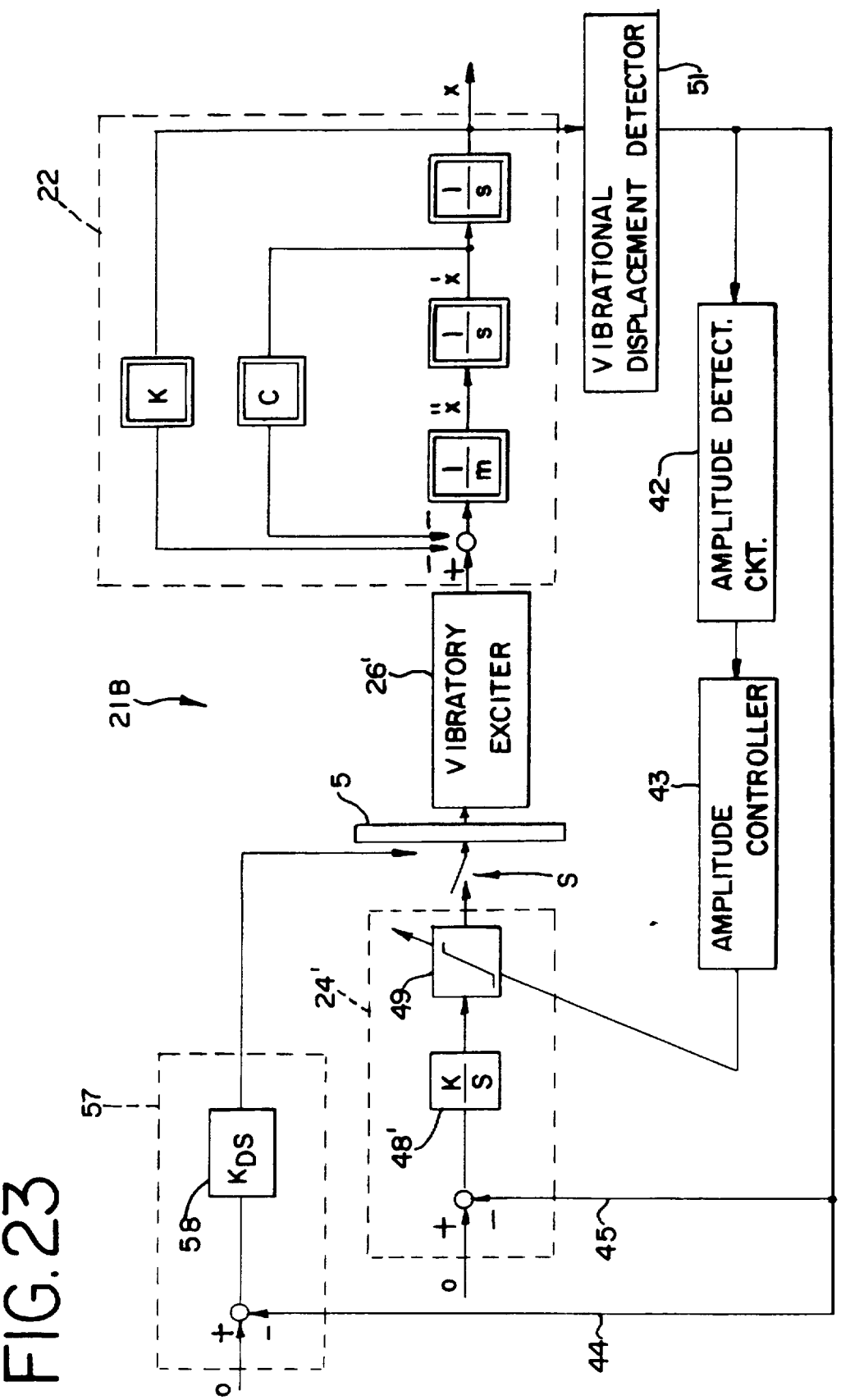
FIG. 23 is a block diagram of a vibratory apparatus according to a sixth embodiment of this invention.

FIG. 23 shows a vibratory system according to a sixth embodiment of this invention. It is generally denoted by a reference numeral 21B. Parts which correspond to those in FIG. 20 are denoted by the same reference numerals, the details of which will be omitted.

In this embodiment, the vibration displacement of the vibratory machine 22 is detected by a vibrational displacement detector 51 and it is suitably amplified by the amplitude detecting circuit 42. The amplified output is supplied to the amplitude controller 43. The output of the vibrational displacement detector 51 may be amplified by a gain amplifier and then it may be negatively fed-back through the electric wire 45 to the self-excited oscillation circuit 24'. Further, it is negatively fed-back to the stop apparatus 57. However, in this embodiment, it is supplied to a $K_D s$ amplifying apparatus 58 having a function of multiplication, gain $K_D \times$ first order lag element s. The self-excited oscillation controller 24' includes an AC amplifier 48' having a gain K and an integration element 1/s. In this embodiment, the phase lag is not generated by the vibratory exciter 26'.

There has been described construction of the sixth embodiment of this invention. Next, operation will be described.

At the start of the self-excited oscillation, the change-over switch S is changed over at the side of the self-excited oscillation controller 24'. The output of the vibrational displacement detector 51 is negatively fed-back to the self-excited oscillation controller 24'. It is integrated or the phase is made to lag by 90 degrees. The vibratory machine 22 is vibrated at the resonant point. Accordingly, the phase difference of 180 degrees is formed at the closed loop. Accordingly, the vibratory machine 22 can be stably self-excitedly vibrated.

To stop the vibratory machine 22, the change-over switch S is changed over at the side of the stop apparatus 57. The output of the vibrational displacement detector 51 is negatively fed-back and it is differentiated. Thus, the phase is advanced by 90 degrees and amplified by the gain $K_D$. Then, it is supplied to the vibratory exciter 26'. In the same manner as the case that the vibratory velocity is negatively fed-back, since the advance of the phase by 90 degrees is equivalent to differentiating the output, the vibration of the vibratory machine 22 can be rapidly reduced to zero in the same manner as in the fifth embodiment.

Figure 24:
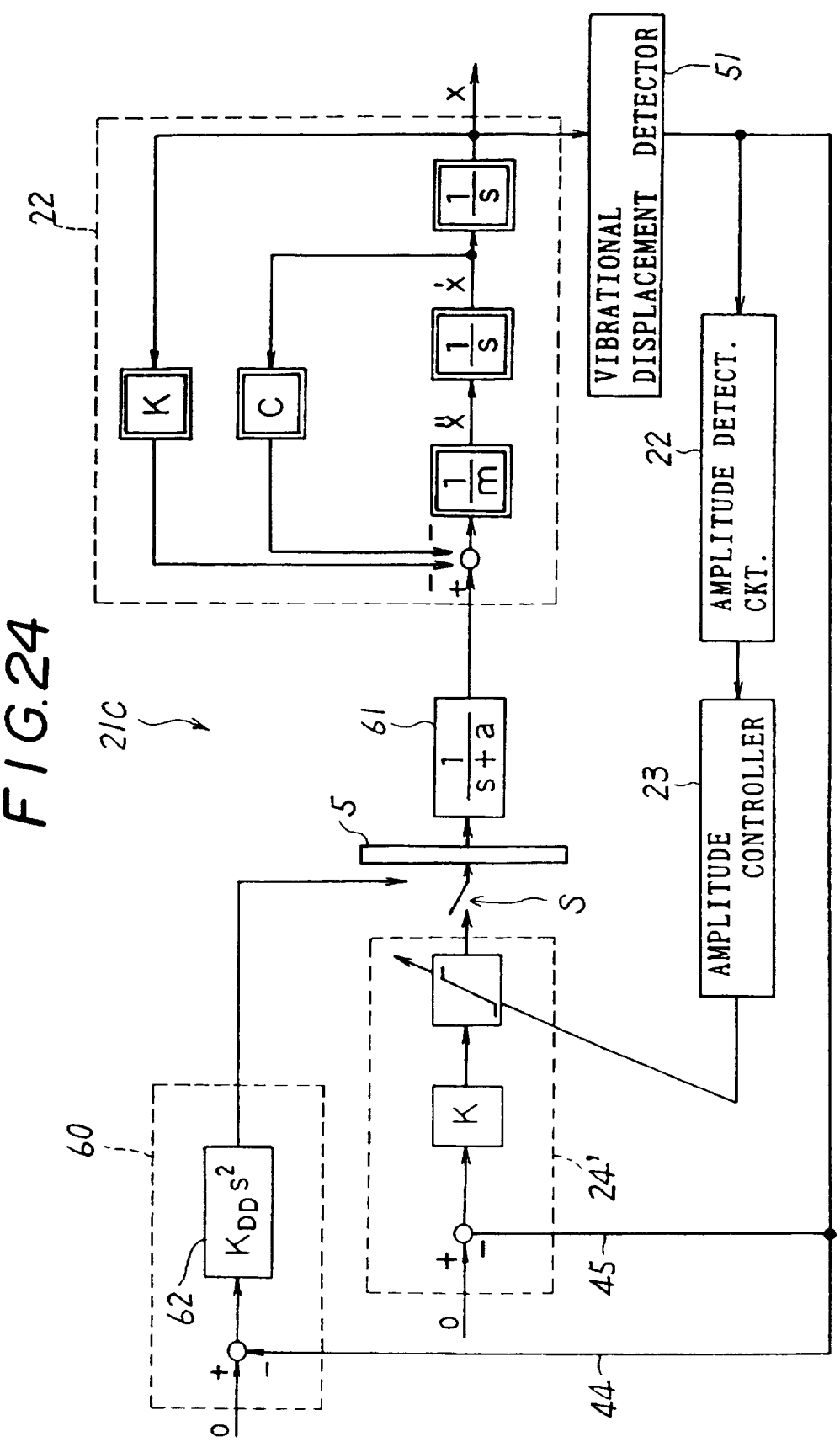
FIG. 24 is a block diagram of a vibratory apparatus according to a seventh embodiment of this invention.

FIG. 24 is a vibratory system according to a seventh embodiment of this invention. It is generally represented by a reference numeral 21C. Parts which correspond to those in FIG. 23, are denoted by the same reference numerals, the detail of which will be omitted.

Also in this embodiment, the output of the vibrational displacement detector 51 is negatively fed-back to the self-excited oscillation controller 24'. Further, the output of the vibrational displacement detector 51 is negatively fed-back to a stop apparatus 60 which includes a DC amplifier 62 of a gain $K_{DD}$ and $s^2$ element. However, the output of the vibrational displacement detector 51 may be once differentiated and so advanced by 90 degrees. Instead, it may be twice differentiated. The vibratory exciter 61 is the electric-magnetic as in the fifth embodiment. It has the phase lag element of $1/(s+a)$.

There has been described construction of the seventh embodiment of this invention. Operation will be described.

When the change-over switch S is changed over at the side of the self-excited oscillation controller 24', the vibratory machine 22 starts self-excitedly to oscillate in the same manner as in the above embodiment. To stop the vibratory machine 22, the change-over switch S is changed over at the side of the stop apparatus 60. Accordingly, the output of the vibrational displacement detector 51 is negatively fed-back to the self-excited oscillation controller 24'. The output is twice differentiated and the phase is advanced by 90 degrees. As in the fifth embodiment, the velocity signal is advanced by 90 degrees. Then, it is supplied to the vibratory exciter 61. Thus, the phase difference of 180 degrees can be obtained in the closed loop. The vibratory machine 22 receives a force opposite to the moving direction, since the output is negatively fed-back. Thus, the movable part of the vibratory machine 22 can be rapidly reduced to 0.

Figure 25:
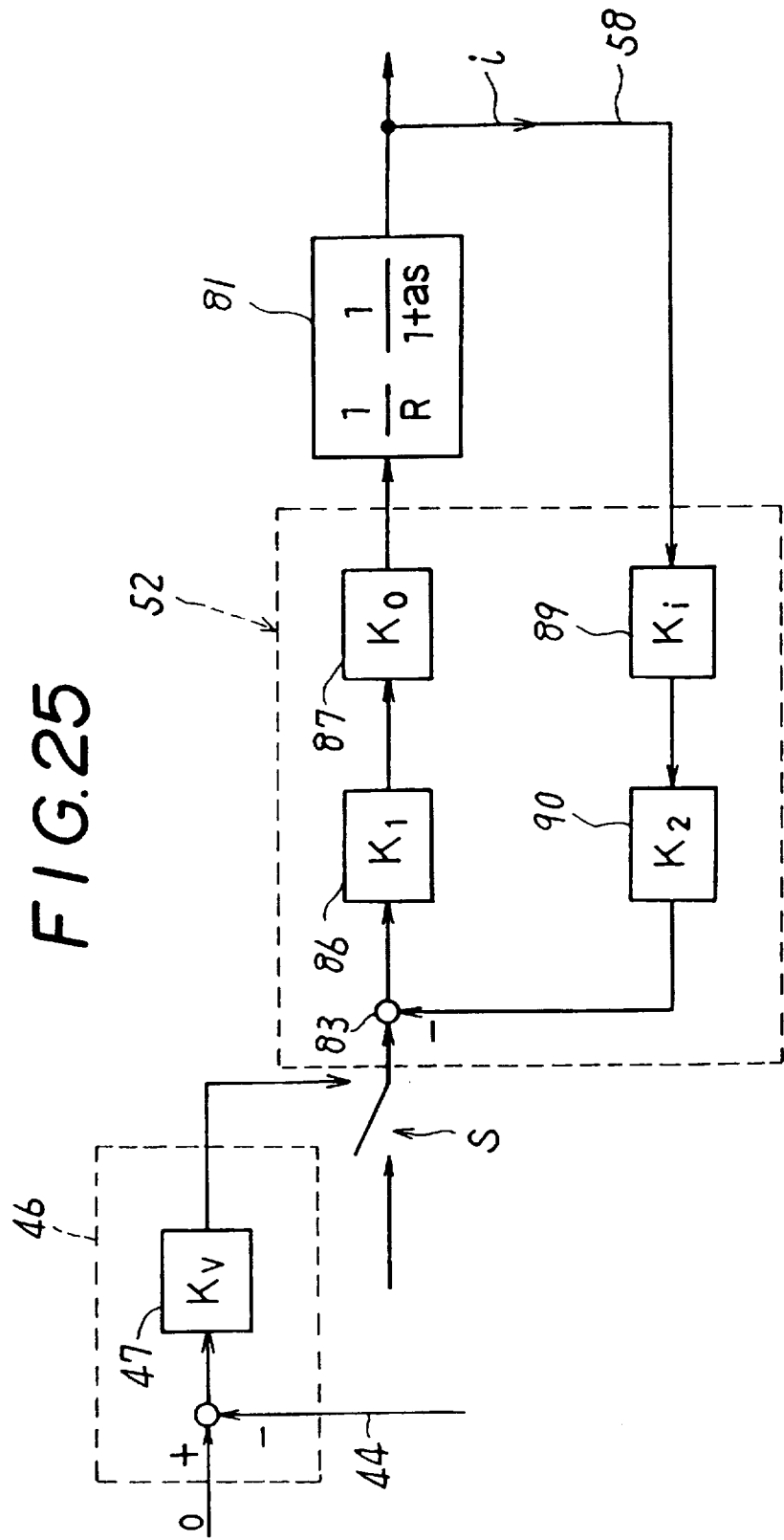
FIG. 25 is a block diagram of an eighth embodiment of this invention.
Figure 26:
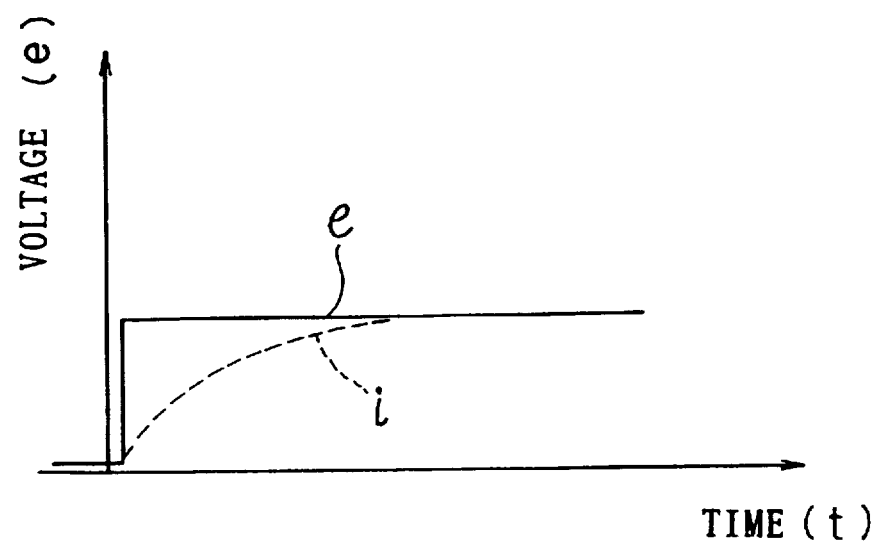
FIG. 26 is a chart for explaining the operation of the eighth embodiment of this invention.
Figure 27:
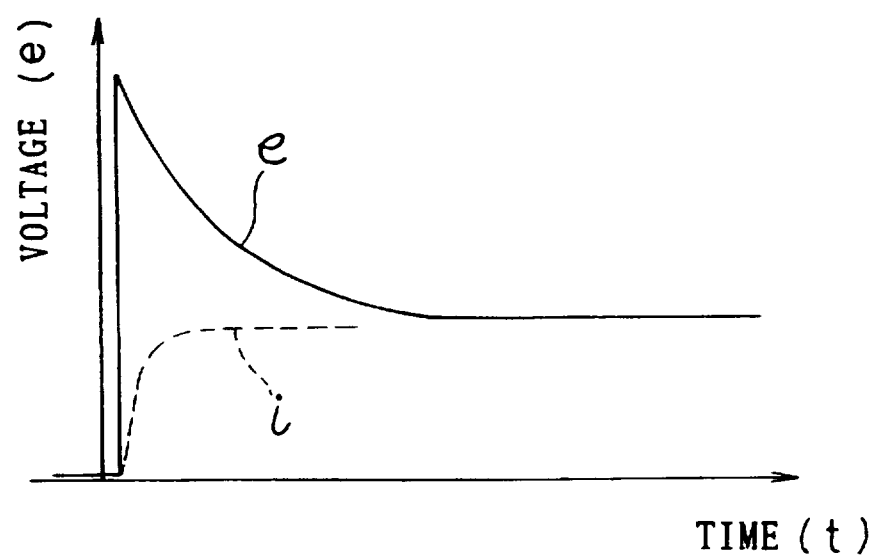
FIG. 27 is a chart for explaining a further operation of the eighth embodiment.

FIG. 25 to FIG. 27 show an eighth embodiment of this invention. In this embodiment, a minor loop circuit is added to the circuit of the fifth embodiment. Also in this embodiment, the vibratory exciter is an electro-magnet 81. It has the lag element of $(1/R)\times[1/(1+as)]$. Current i as the output is detected by a current detector 89 having a gain Ki. It is amplified by current minor feedback gain controller 90 of gain $K_2$. It is negatively fed-back to a comparator 83. On the other hand, as above described, the vibrational speed signal is negatively fed-back to another input terminal of the comparator 83. The output of the comparator 83 is supplied to the current minor feedback gain circuit 86. Further it is amplified by a power amplifier 87 having a gain $K_0$. The output is supplied to the electro-magnet 81. With the minor loop circuit, the electric-magnetic 81 is put into the over-magnetizing condition as shown in FIG. 26. When the stop instruction is supplied, the voltage is steeply raised and it changes with time as shown in FIG. 27. It can more rapidly rise in comparison with the case that the minor loop circuit is not used. Accordingly, the vibratory machine 42' can be more rapidly stopped. FIG. 26 shows the case that the current minor feedback control is not effected. A voltage e is step-wisely supplied as the instruction signal. The current i gradually increases with time. At this case, the stop can be retarded.

Figure 28:
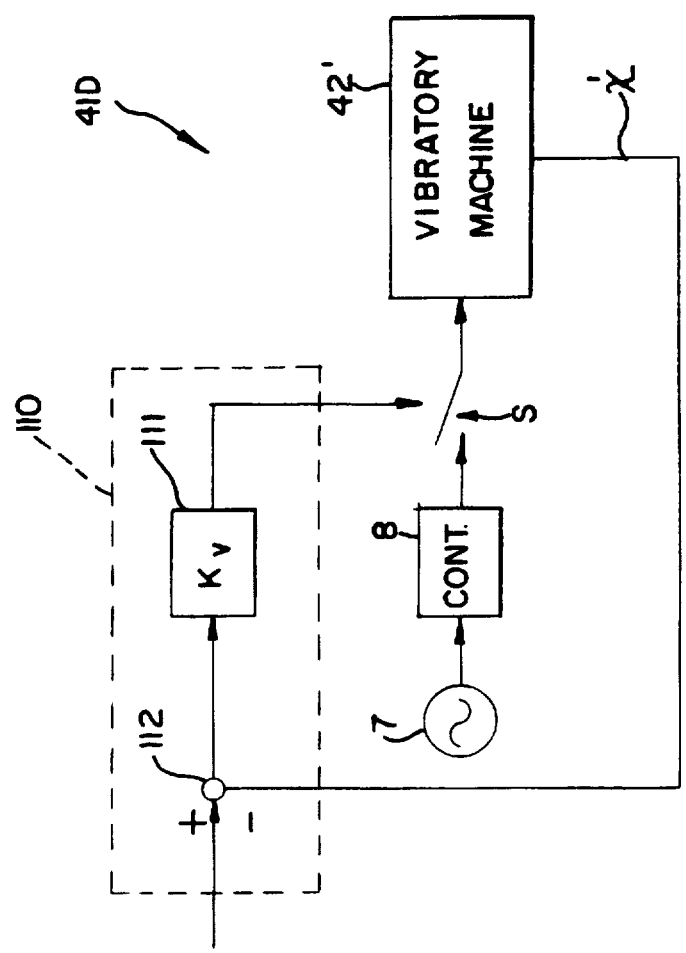
FIG. 28 is a block diagram of an important part of a ninth embodiment of this invention.

FIG. 28 shows a vibratory apparatus according to a ninth embodiment of this invention. It is generally represented by a reference numeral 41D. It is of the forced-vibration type. A stop apparatus 110 includes a comparator 112 and a gain amplifier 111. The velocity (dx/dt) of the vibratory machine 42' is negatively fed-back to a comparator 112 and it is amplified by an amplifier 111 having gain Kv. Then, it is supplied to the electric-magnetic of the vibratory machine 42'. As above described embodiment, the electric-magnetic makes the phase lag by 90 degrees. When the vibratory machine 42' is vibrated nearly at the resonant point, a force opposite to the vibrational speed can be applied to the movable part. Thus, the braking force is applied to the movable part. Accordingly, it can be rapidly stopped.

When the vibratory machine is vibrated at the frequency which is far from the resonant point, a phase advance element may be added in the stop apparatus 110.

While the preferred embodiments have been described, variations thereto will occur to those skilled in the art within the scope of the present inventive concepts which are delineated by the following claims.

For example, in the first embodiment, the vibratory machine 12 is the vibratory parts-feeder. However, instead all kinds of vibratory machines having an electric-magnetic vibrational mechanism can be applied to the first embodiment of this invention.

Further in the above first embodiment, the vibratory displacement 13 is of the eddy current type and it is adjacent or attached to the leaf spring 10. Instead, a vibratory exciter of the piezo electric type may be used. At this case it is attached to the movable part M and the output of the vibratory detector is twice integrated to obtain the vibrational displacement and it is supplied to the amplitude controller 14.

In the fourth embodiment, the vibrational speed of the vibratory machine 31 is detected and the output is positively fed-back. The closed loop is formed to effect the self-excited oscillation. Instead, a vibratory displacement may be detected and an output of the vibrational displacement is negatively fed-back to the self-excited oscillation controller 35. The above described feedback gain K may be varied to make the phase lag. As clear from the self-excited oscillation principal or theory, the phase difference between the force and the displacement is equal to $\pi/2$ at the resonant point. Accordingly, a lag element of $\pi/2$ may be used to make the phase lag by $\pi/2$.

In the above description, the eighth embodiment of FIG. 25 is applied to the fifth embodiment. However, it may be applied to the other embodiments. In this case, the amplifier 111 should be an electric power amplifier in the embodiment of FIG. 28. Instead, an electric power amplifier may be arranged between the change-over switch S and the vibratory machine 42'.

Further, this embodiment can be applied to all kinds of the vibratory apparatus of the self-excited oscillation type or the enforced vibration type. Further, the vibratory exciter may be of the moving coil type or piezo electric type. Generally, in the vibratory apparatus which generates a vibrational force by an electric energy, any vibrational speed detecting means may be arranged adjacent to or attached to the movable part of the vibratory apparatus, an output of the vibrational speed detector is directly or amplified and negatively fed-back to the vibrational force generating mechanism. When an acceleration may be detected in this case, the output is once differentiated. Thus, a force opposite to the vibrational direction of the moving part is applied to the moving part. Thus, the moving part can be rapidly stopped.

What is claimed is:

1. In a control system for a vibratory apparatus including:

(A) vibratory speed detecting means for detecting a vibratory speed of a vibratory machine;

(B) a self-excited oscillation controller for amplifying the output of said vibratory speed detecting means at a feed-back gain K, said oscillation controller receiving the output of said vibratory speed detecting means as a positive feed-back signal;

(C) a power amplifier for power-amplifying the output of said self-excited oscillation controller; and (D) a vibratory exciter receiving the output of said power amplifier for vibrating said vibratory machine, the improvements in which said feed back gain K is changed in accordance with the equation: $K=K_1\Delta r+K_N(\Delta r)^{2N+1}+Kcr$, where, $\Delta r$ represents the amplitude difference between a predetermined amplitude and the present amplitude, $K_1$, $K_N$ are constants, N is an integer, and Kcr is critical stability gain.

2. A control system for a vibratory apparatus according to claim 1 in which a closed loop is formed by said vibratory machine, said vibratory speed detecting means, said self-excited oscillation controller, said power amplifier and said vibratory exciter, and in which said closed loop is opened when said vibratory machine is stopped, and the output of said vibratory speed detecting means is amplified as a negative feed-back signal at a second feed-back gain, and supplied to said vibratory exciter.

3. A vibratory apparatus according to claim 2 in which means for detecting magnetic flux from said vibratory exciter is provided and the output of said means is amplified and negatively fed-back to said power amplifier.

4. In a control system for a vibratory apparatus including:

(A) vibratory displacement detecting means for detecting a vibratory displacement of a vibratory machine;

(B) a self-excited oscillation controller for amplifying the output of said vibratory displacement detecting means at a feed-back gain K, said oscillation controller receiving the output of said vibratory displacement detecting means as a negative feed-back signal, and controlling phase lag by integrating element or first order lag element, and said oscillation controller controlling phase lag either by intergrating the output of said vibratory displacement detecting means or by means of a first order lag element;

(C) a power amplifier for power-amplifying the output of said self-excited oscillation controller; and (D) a vibratory exciter receiving the output of said power amplifier for vibrating said vibratory machine, the improvements in which said feed back gain K is changed in accordance with the equation: $K=K_1\Delta r+K_N(\Delta r)^{2N+1}+Kcr$, where $\Delta r$ represents the amplitude difference between a predetermined amplitude and the present amplitude, $K_1$, $K_N$ are constants, N is an integer, and Kcr is critical stability gain.

5. A control system for a vibratory apparatus according to claim 4 in which a closed loop is formed by said vibratory machine, said vibratory displacement detecting means, said self-excited oscillation controller, said power amplifier and said vibratory exciter, and in which said closed loop is opened when said vibratory machine is stopped, and the output of said vibratory displacement detecting means is differentiated and amplified as a negative feed-back signal at a second feed-back gain, and supplied to said vibratory exciter.

6. A control system for a vibratory apparatus according to either of claims 2 and 5 in which said negative signal is supplied through a phase-advancer to said vibratory exciter for compensating the phase lag of said vibratory exciter.

7. In a control system for a vibratory apparatus including:

(A) vibratory displacement detecting means for detecting a vibratory displacement of a vibratory machine;

(B) a self-excited oscillation controller for amplifying the output of said vibratory displacement detecting means at a feed-back gain K, said oscillation controller receiving the output of said vibratory displacement detecting means as a negative feed-back signal;

(C) a power amplifier for power-amplifying the output of said self-excited oscillation controller; and (D) an electric-magnetic receiving the output of said power amplifier and generating a magnetic-attractive force for vibrating said vibrating machine, the improvements in which said feed back gain K is changed in accordance with the equation: $K=K_1\Delta r+K_N(\Delta r)^{2N+1}+Kcr$, where $\Delta r$ represents the amplitude difference between a predetermined amplitude and the present amplitude, $K_1$, $K_N$ are constants, N is an integer, and Kcr is critical stability gain.

8. A control system for a vibratory apparatus according to claim 7 in which a diode is connected to the electric-magnetic coil of the electric-magnetic.

9. A control system for a vibratory apparatus according to claim 7 in which said electric-magnetic includes a permanent magnet.

10. A control system for a vibratory apparatus according to claim 7 in which a constant DC current is flowed into the electric-magnetic coil of said- electric-magnetic.

11. A control system for a vibratory apparatus according to any one of claims 8 to 10 in which said self-excited oscillation controller includes a saturation element and the saturation level of said saturation element is changed on the basis of the output of said vibratory displacement detecting means.

12. A control system for a vibratory apparatus according to any one of claims 8 to 10 in which said self-excited oscillation controller has the function of phase lag by which the frequency of the self-excited oscillation is so controlled as to correspond to the resonant frequency of said vibratory machine.

13. A control system for a vibratory apparatus according to claim 7 in which a closed loop is formed by said vibratory machine, said vibratory displacement detecting means, said self-excited oscillation controller, said power amplifier and said vibratory exciter, and in which said closed loop is opened when said vibratory machine is stopped, and the output of said vibratory displacement detecting means are twice differentiated, or once differentiated and phase-advanced by 90 degrees, and amplified as a negative feed-back signal at a second feed-back gain, and supplied to said electric-magnetic.

* * * * *